(12) United States Patent
Appleyard et al.

(10) Patent No.: US 6,316,763 B1
(45) Date of Patent: Nov. 13, 2001

(54) OPTICAL SAFETY DEVICE FOR MOUNTING ON A MOVING MEMBER

(76) Inventors: Robert Meredith Appleyard, c/o Lazer Safe Pty Ltd Suite 4, 295 Rokeby Road, Subiaco (AU); Kevin Stephen Davies, 23 Baxter Way, Padbury (AU), 6025

(*) Notice: Subject to any disclaimer, the term of this patent is extended or adjusted under 35 U.S.C. 154(b) by 0 days.

(21) Appl. No.: 09/101,719

(22) PCT Filed: Jan. 6, 1997

(86) PCT No.: PCT/AU97/00005

§ 371 Date: Apr. 16, 1999

§ 102(e) Date: Apr. 16, 1999

(87) PCT Pub. No.: WO97/25568

PCT Pub. Date: Jul. 17, 1997

(Under 37 CFR 1.47)

(30) Foreign Application Priority Data

Jan. 5, 1996 (AU) .................................................. PN7446

(51) Int. Cl.[7] ............................. G01D 21/04; F16D 13/14
(52) U.S. Cl. ......................... 250/221; 100/342; 340/555; 192/130
(58) Field of Search ................................ 250/221, 222.1; 340/555–557; 100/342, 348, 347; 192/129 A, 130

(56) References Cited

U.S. PATENT DOCUMENTS

| | | | |
|---|---|---|---|
| 1,958,128 | * 5/1934 | Cate | 250/214.1 |
| 3,970,846 | 7/1976 | Schofield, Jr. et al. | |
| 4,166,369 | * 9/1979 | Nakajima | 72/26 |
| 4,489,578 | * 12/1984 | Nagai et al. | 72/21 |
| 4,660,703 | 4/1987 | Filcich et al. | |
| 5,579,884 | 12/1996 | Appleyard et al. | |

FOREIGN PATENT DOCUMENTS

| | | |
|---|---|---|
| 1307078 | 2/1973 | (GB) . |
| 852037 | * 7/1949 | (NL) . |

* cited by examiner

*Primary Examiner*—Stephone B. Allen
(74) *Attorney, Agent, or Firm*—Miles & Stockbridge P.C.; John C. Kerins; William L. Feeney

(57) ABSTRACT

Safety apparatus and method for protecting an object entering into the path of a moving blade in a press brake (10). The apparatus includes laser emitters (22) and receivers (24) for mounting in fixed relationship to the leading edge (36) of the blade (18) to provide a plurality of light beams (26) in advance of the blade (18). A controller (51) including halting means (57) for halting advancing movement of the blade in response to certain contingencies is provided. These contingencies include those involving interruption or obstruction of the light beams (26) and those which are indicative of a fault with the press or the safety apparatus itself. Accordingly the controller (51) also includes laser control and processing means (54), blade movement control means (56) and blade position processing means (58) which operate in conjunction with the halting means (57) to enable overriding control of the movement of the blade (18). The laser control and processing means further includes pulsing means (55) to pulse the emitted light beams (26) in a unique manner so that each beam (26) can be differentiated from the others and also from ambient light sources. Vibration sensing means is also provided to enable discrimination between normal and abnormal vibration of the laser emitters (22) and receivers (24). The method involves use of a mute point set a prescribed height above the material to be pressed whereby operation of the halting means (57) is associated with the position of the blade (18) relative to the mute point, whereby sensing of the laser beams for interruption or obstruction is muted after the blade (18) reaches the mute point. Different arrangements for setting the mute point are also described.

30 Claims, 15 Drawing Sheets

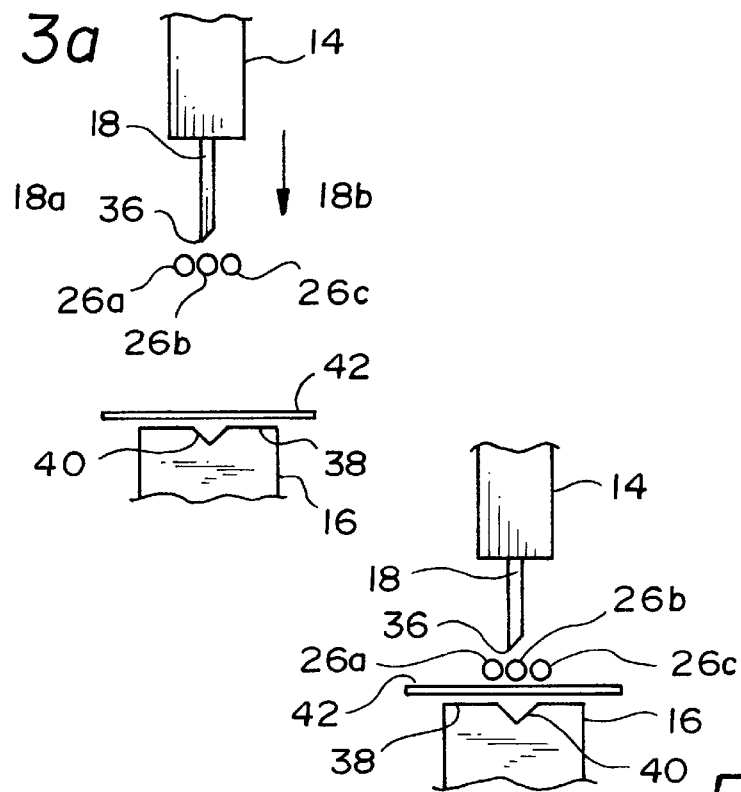
FIG. 3a
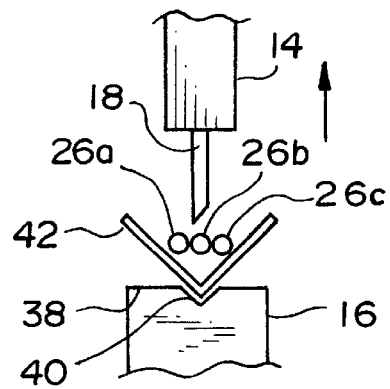
FIG. 3b
FIG. 3c

FIG. 4a
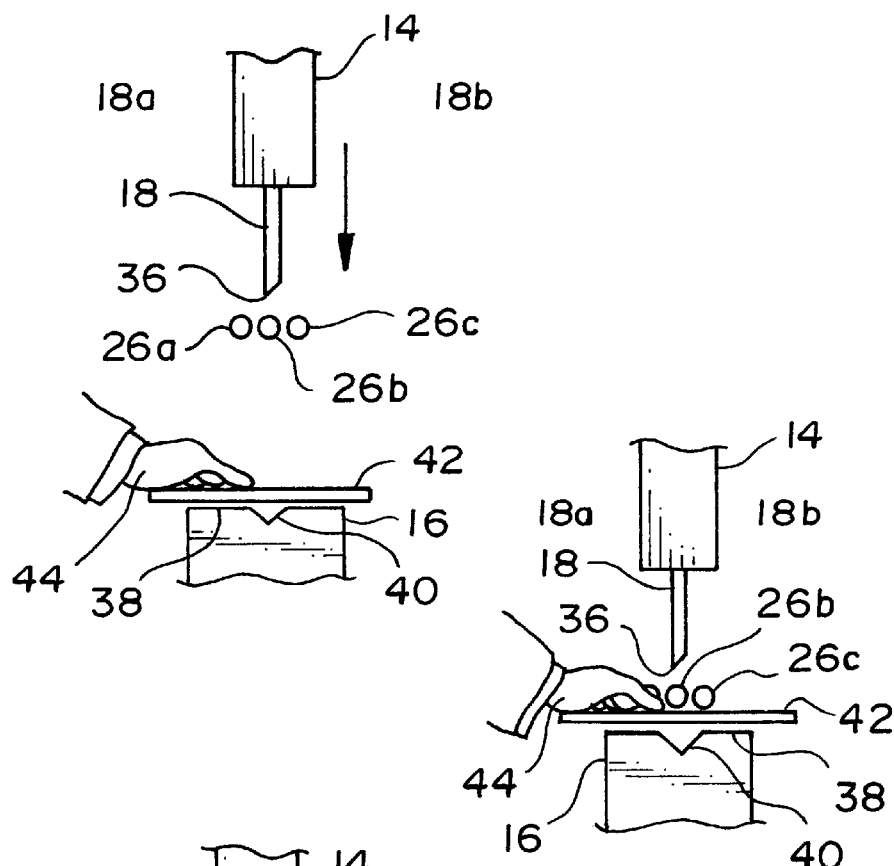
FIG. 4b
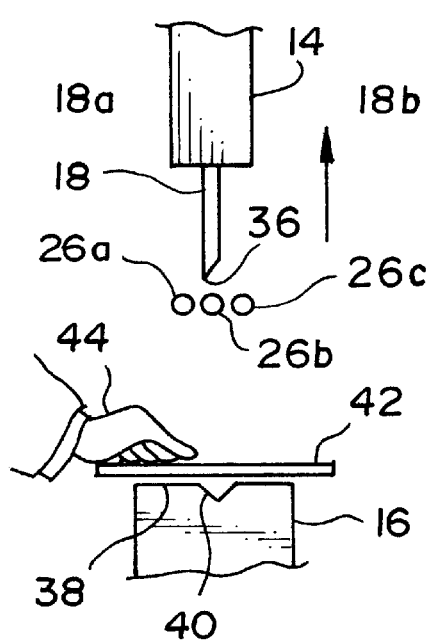
FIG. 4c

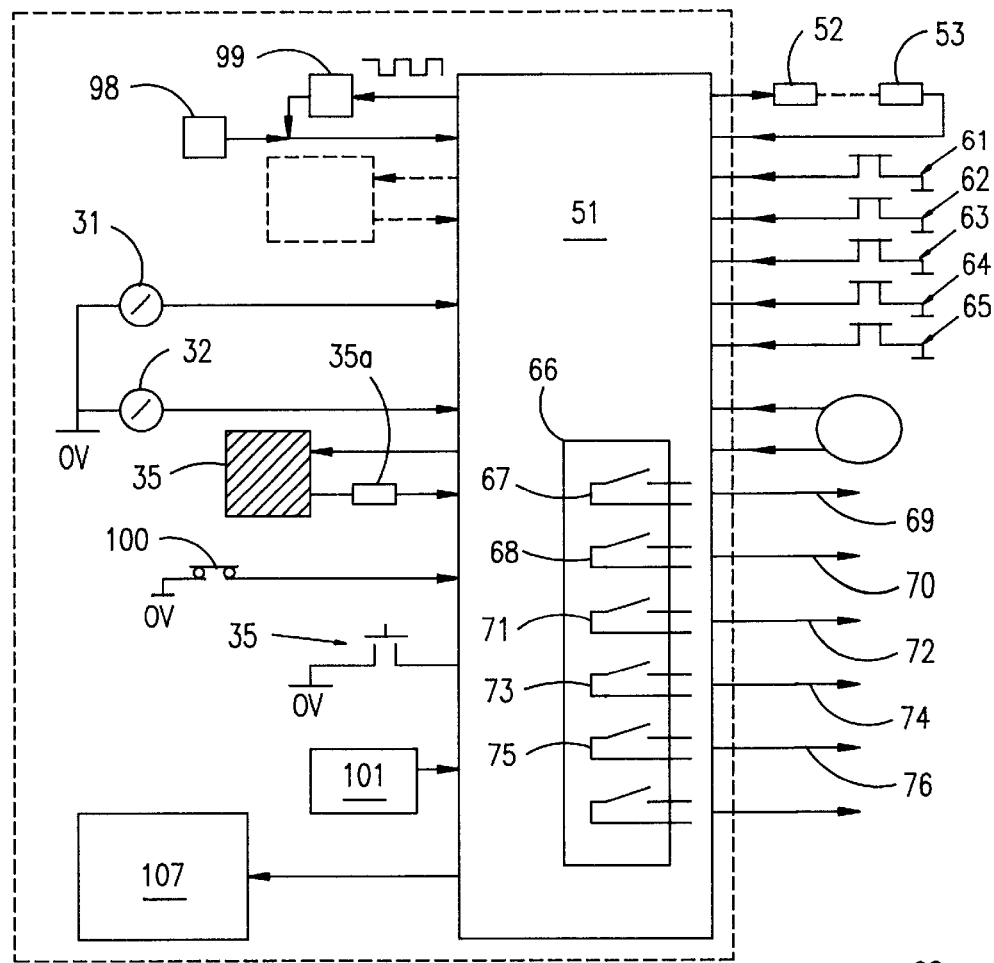
FIG. 7
FIG. 8
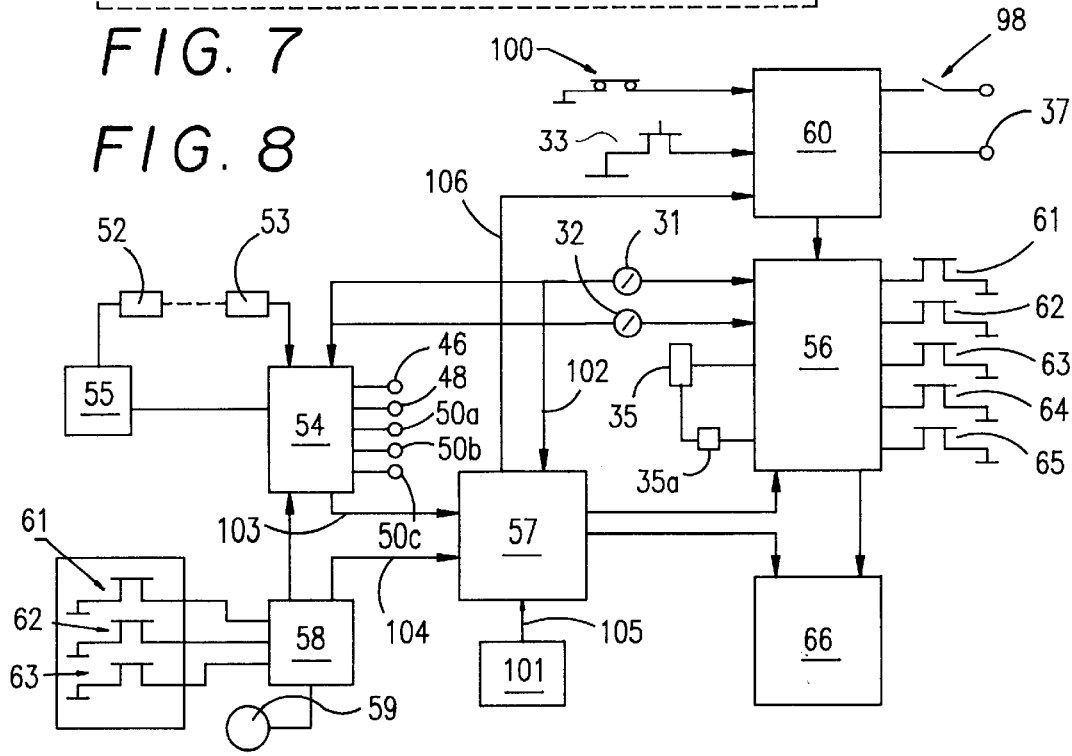

OPTICAL SAFETY DEVICE FOR MOUNTING ON A MOVING MEMBER

TECHNICAL AREA

The present invention relates to a safety apparatus and protection method for machines having a moving member.

BACKGROUND ART

The invention has particular, although not exclusive, utility with respect to press brakes and other types of machines having an active member with which an operator works in close proximity to and can have a body member enter the neighbourhood of an active member during traversing of the active member or during traversing of a co-operating member converging with the active member, such as occurs in an upstroking press brake. The invention is a development of the safety apparatus disclosed in Australian Patent Application No. 27084/92, which is incorporated herein by reference.

DISCLOSURE OF INVENTION

Accordingly, it is an object of the present invention to protect objects entering the neighbourhood of an active member of a machine from being impinged by the active member or by the active member and a co-operative member where there is converging movement between the active member and the co-operative member.

In accordance with one aspect of the present invention, there is provided a safety apparatus for a machine having an active member and a moving member, whereby the moving member is also the active member of the machine, or alternatively the moving member is a member co-operating with the active member and which selectively moves convergingly towards the active member of the machine, the safety apparatus including:

corresponding light emitting means and light receiving means for mounting in fixed relationship with the leading edge of an active member, so as to define a protected region spaced from the active member;

said light emitting means being adapted for emitting a beam of light and the corresponding light receiving means being adapted for receiving the beam of light so that normally the beam may be emitted and received by said corresponding light emitting means and light receiving means along an uninterrupted path spaced from the leading edge of the active member; and control means to activate said light emitting means to emit the light beam and said light receiving means to sense receipt of the emitted light beam during a range of prescribed movement of the moving member;

wherein said control means includes halting means for halting advancing movement of the moving member in response to some contingency as detected or sensed by said control means.

Preferably, the moving member completes said range of prescribed movement at a mute point and can continue moving through a further range of prescribed movement past said mute point during which said halting means is disabled from halting advancing movement of the moving member for certain contingencies.

Preferably, said control means includes position processing means to continuously track the movement of the moving member and check that said movement is in accordance with said prescribed movement; and wherein said halting means halts advancing movement of the moving member in response to said position processing means determining that said advancing movement is not in accordance with said prescribed movement.

Preferably, said position processing means includes tracking means to measure instantaneous movement of said moving member, said position processing means recording said mute point relative to the position of said moving member as measured by said tracking means and thereafter continuously checking for the occurrence of the measured location of the mute point as determined by said tracking means for effecting control of the movement of said moving member.

Preferably, said control means includes pulsing means to cause said light emitting means to generate the light beam so that it is pulsed in a prescribed manner, and light control and processing means to control the operation of said pulsing means and process signals received by said light receiving means to determine when the emitted light beam is not received or pulsed in said prescribed manner; and wherein said halting means halts advancing movement of the moving member in response to said light control and processing means determining that the emitted light beam is not received or pulsed in said prescribed manner during said range of prescribed movement.

Preferably, the safety apparatus includes a plurality of corresponding light emitting means and light receiving means to be disposed to define a barrier of light paths around the leading edge, and said pulsing means being adapted to cause each of said corresponding light emitting means and light receiving means to be pulsed in a different manner to differentiate between them.

Preferably, said control means includes vibration sensing means to analyse signals in response to said light receiving means sensing receipt of the light beam and distinguish between normal vibration of the light beam and abnormal interruption of the light beam; and wherein said halting means halts advancing movement of the moving member in response to said vibration sensing means sensing said abnormal interruption of the light beam during said range of prescribed movement.

Preferably, said light emitting means is mounted at one end of the active member and said light receiving means is mounted at the opposing end of the active member so that vibrational movement of the corresponding light emitting means and light receiving means which causes oscillatory movement of the emitted light beam is damped in one dimension transverse to the path of said light beam to essentially confine the resultant oscillatory movement of the light beam to a single transverse dimension substantially orthogonal to said one dimension to reduce the detection time taken in sensing a said abnormal interruption of the light beam.

Preferably, a plurality of said corresponding light emitting means and light receiving means are provided so that said light emitting means are integrally mounted in substantially parallel relationship adjacent to each other as a discrete unit relative to the active member and said light receiving means are integrally mounted in substantially similar parallel relationship adjacent to each other as a separate discrete unit relative to both the active member and said discrete unit, but in substantial alignment with said corresponding light emitting means to receive the respective emitted light beams therefrom, such that vibrational movement is imparted to each discrete unit as a whole causing synchronous and corresponding oscillation to said light beams and synchronous and corresponding sensing of uninterrupted passage of said light beams by said light receiving means, thereby facilitating the analysis and discrimination of the received light beams by said vibration sensing means.

Preferably, said moving member tracking means continuously checks the distance advanced by the moving member beyond said mute point with a prescribed maximum distance and if receipt of the emitted light beam is not interrupted within said prescribed maximum distance signals said halting means to halt further advancing movement of the moving member.

In accordance with another aspect of the present invention, there is provided a method for protecting an object entering into the path of a moving member of a machine having an active member, whereby the moving member is also the active member of the machine, or alternatively the moving member is a member co-operating with the active member and which selectively moves convergingly towards the active member of the machine, the method including:

emitting a light beam at one end of the active member along a normally uninterrupted path in advance of the leading edge of the active member whilst the moving member moves through a range of prescribed movement;

continuously sensing the receipt of said light beam at an opposing end of the active member; and halting the advancing movement of the moving member in response to any failure to receive and sense the emitted light beam at the other end of the active member at any time during said range of prescribed movement or in response to some contingency.

Preferably, the method includes pulsing said light beam in a prescribed manner and halting the advancing movement of the moving member in response to failing to receive and sense the emitted light beam as pulsed in said prescribed member at the other end of the active member.

Preferably, the method includes preventing the moving member from being halted after it advances beyond a point defining the limit of said range so that the moving member may be able to continue moving through a further range of prescribed movement.

Preferably, the method includes continuously tracking the movement of the moving member, checking that said movement is in accordance with said prescribed movement and halting advancing movement of the moving member whenever the movement is not in accordance with said prescribed movement.

Preferably, the method includes emitting and sensing the receipt of a plurality of light beams disposed to define a barrier of light paths around the leading edge of the active member, each light beam being pulsed in a different manner to differentiate between them.

Preferably, the method includes analysing the received light beam to discriminate between normal vibration and abnormal interruption of the light beam and halting advancing movement of the moving member in response to sensing said abnormal interruption during said range of prescribed movement.

Preferably, the method includes damping vibrational movement of the light beam in one dimension transverse to the path of said light beam to essentially confine resultant oscillatory movement of said light beam to a single transverse dimension substantially orthogonal to said one dimension to reduce the detection time taken in sensing a said abnormal interruption of the light beam.

Preferably, the method includes emitting a plurality of light beams in substantially parallel relationship to each other such that vibrational movement from the machine is imparted equally to said light beams causing synchronous and corresponding oscillation of said light beams facilitating the analysis and discrimination of same.

Preferably, the method includes completing said range of prescribed movement at a mute point and continuing movement of the moving member through a further range of prescribed movement past said mute point during which advancing movement of the moving member is not halted by certain contingencies.

Preferably, the method includes continuously checking the distance advanced by the moving member beyond said mute point with a prescribed maximum distance and if interruption of the light beam is not sensed within said prescribed maximum distance, halting the advancing movement of the moving member.

Preferably, the method includes continuously measuring the instantaneous movement of the moving member, separately detecting the position of the mute point when the moving member is physically disposed thereat, checking that the detected mute point coincides with the measured mute point whenever wither mute point condition is sensed, and halting further advancing movement of the moving member immediately upon establishing a difference in the occurrence between the two.

The invention will be better understood in light of the following description of two specific embodiments thereof. The description is made with reference to the accompanying drawings, wherein.

Figure 5:
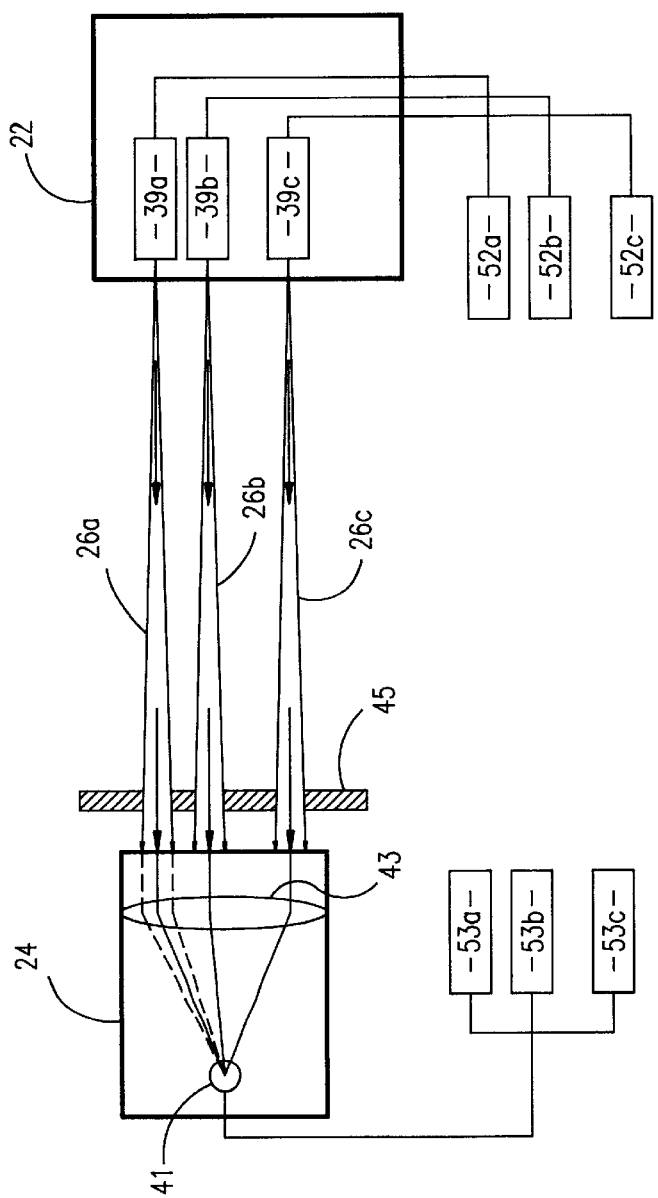
Figure 6:
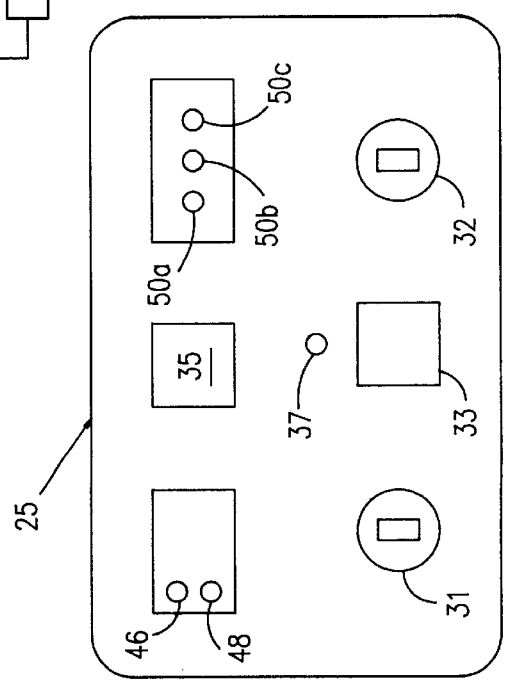
Figure 9A:
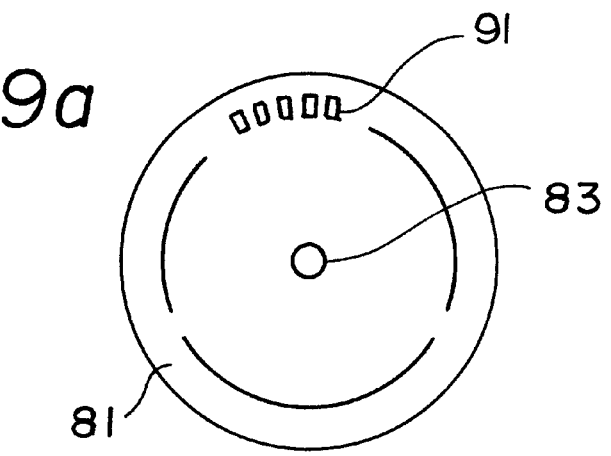
Figure 9B:
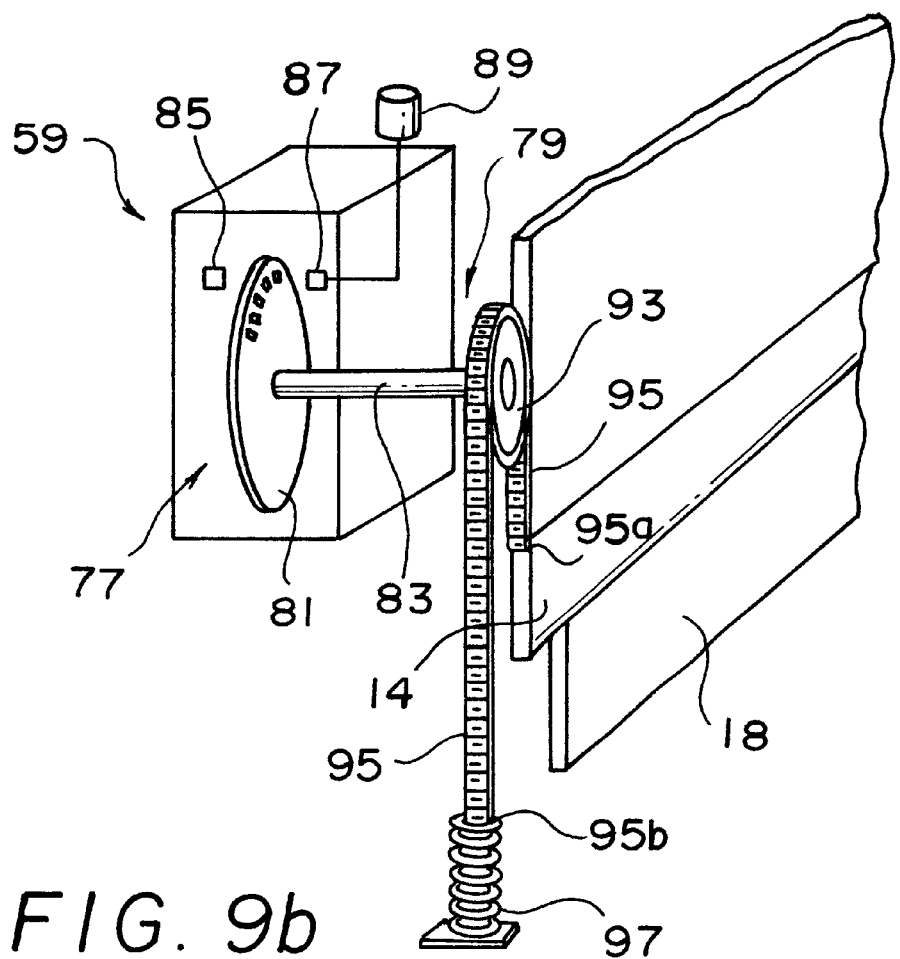
Figure 10:
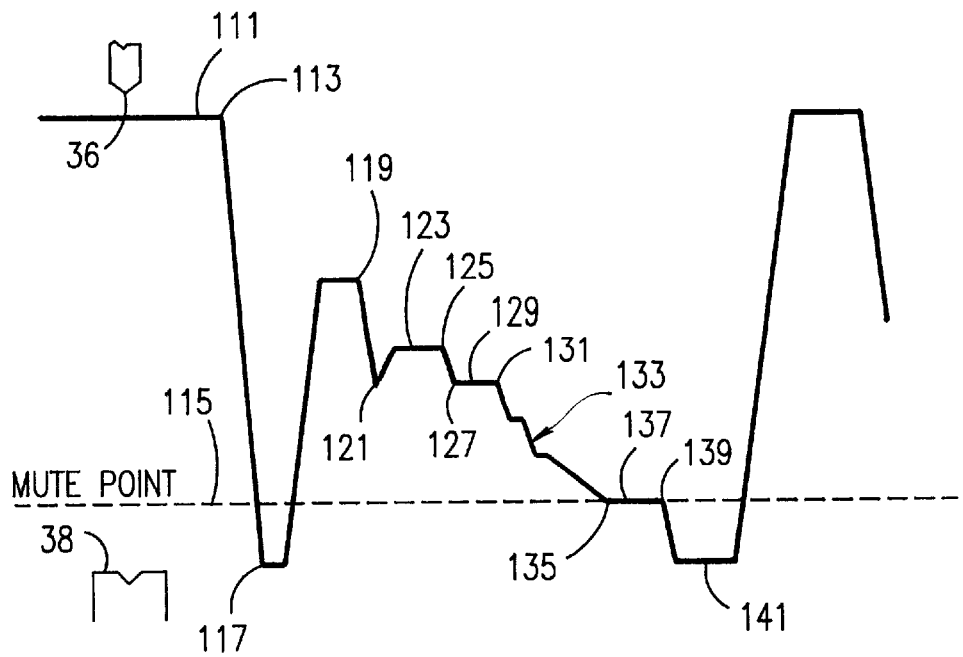
Figure 11:
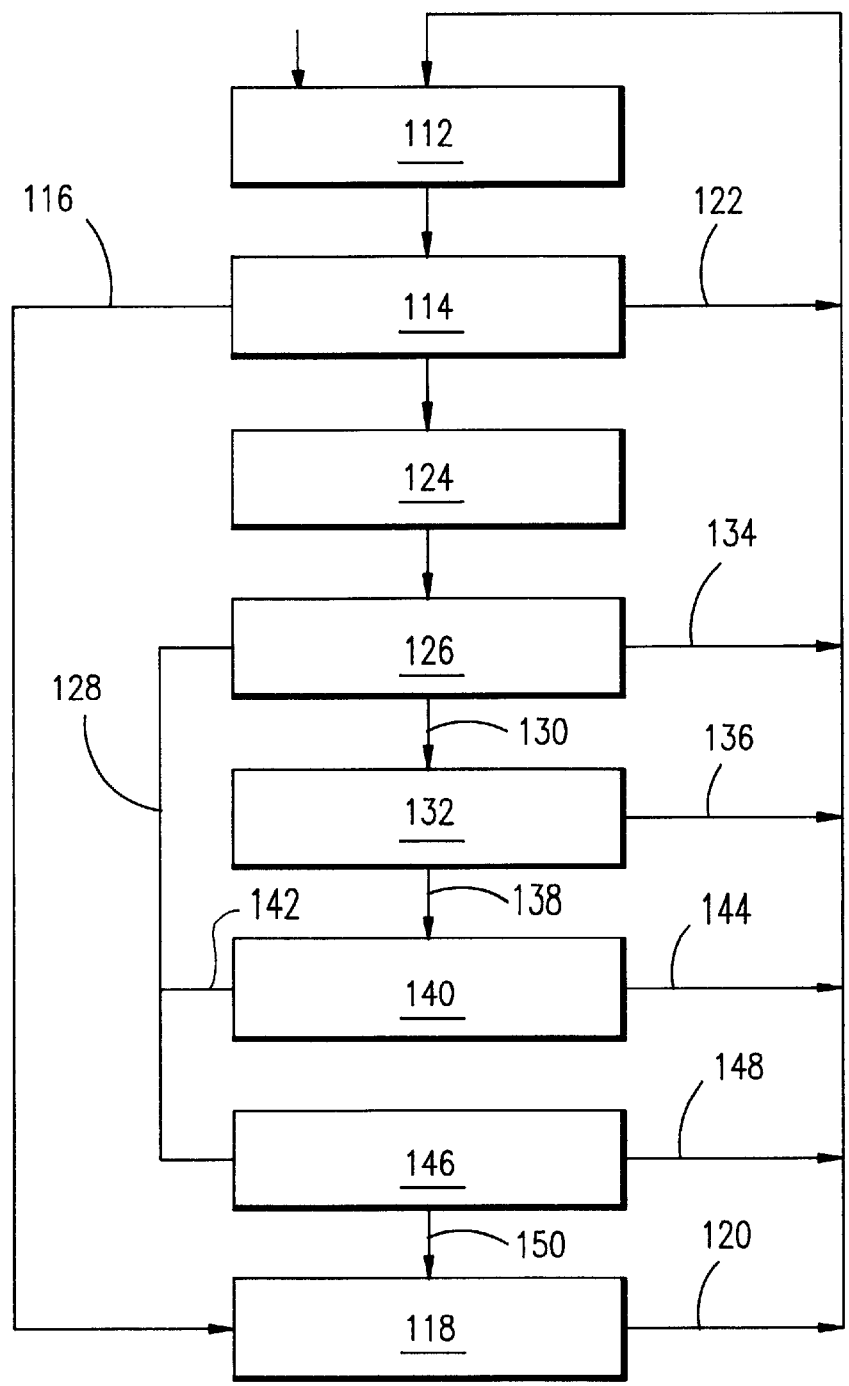
Figure 12:
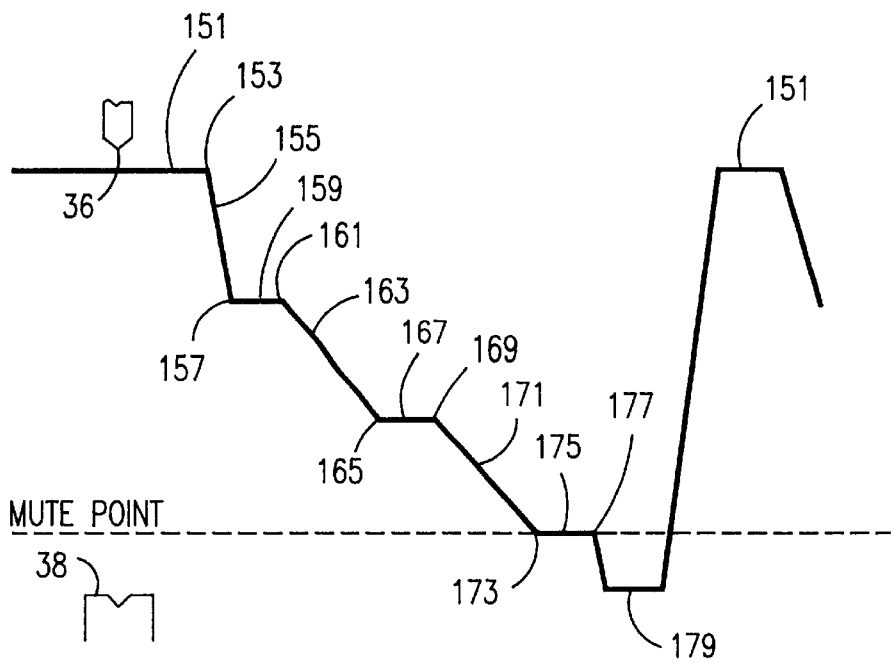
Figure 13:
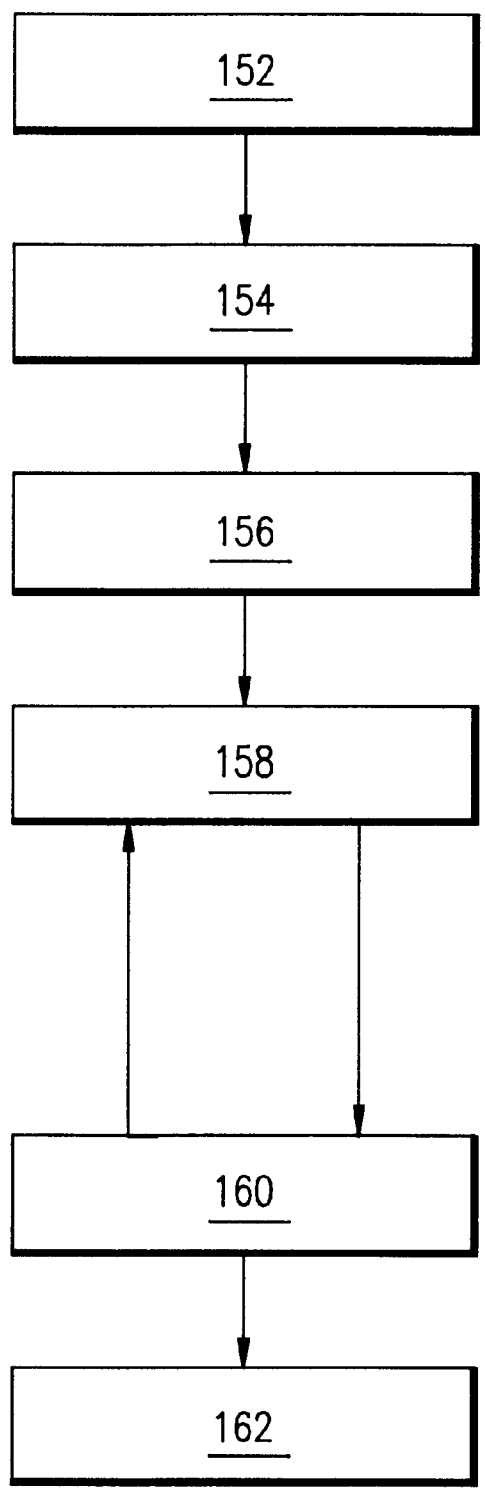
Figure 14:
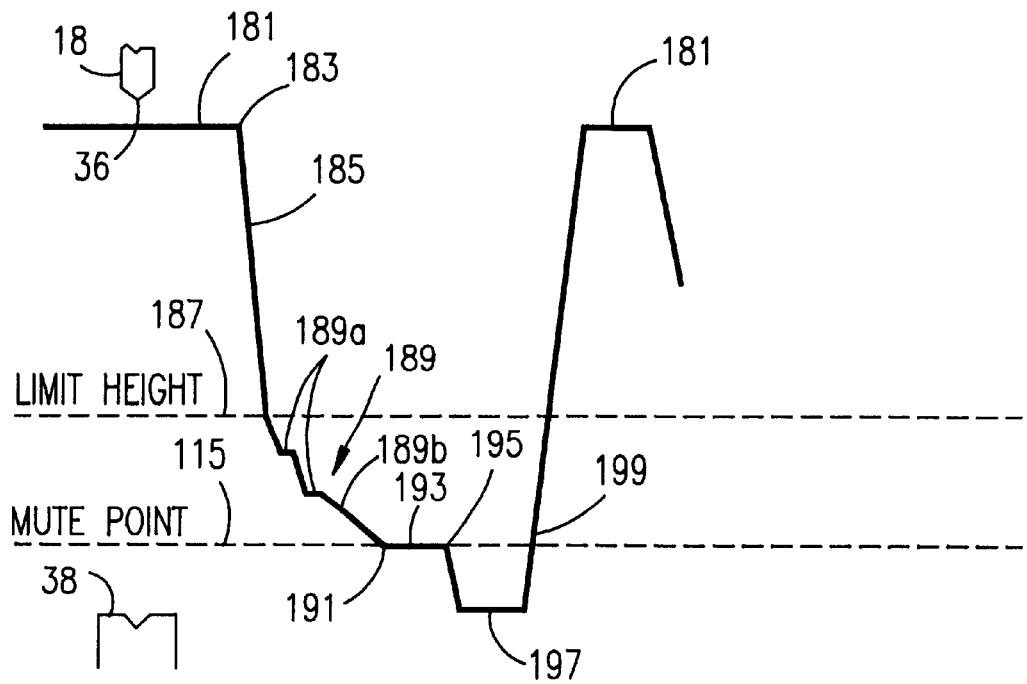
Figure 15:
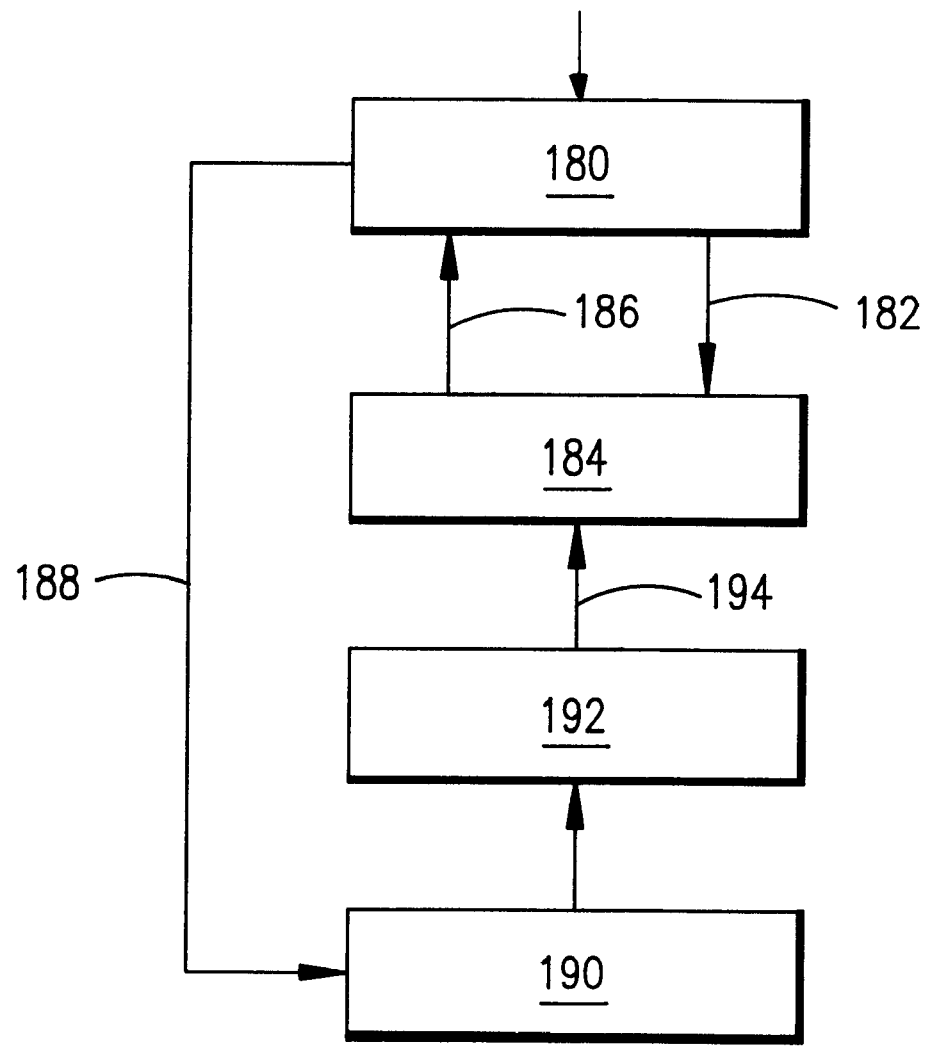
Figure 16:
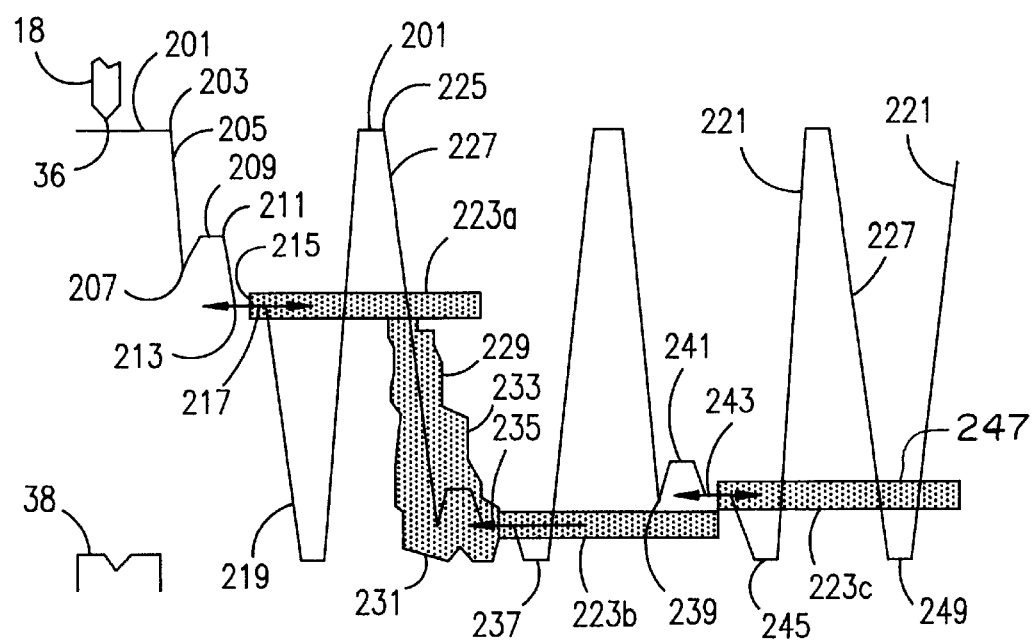
Figure 16:
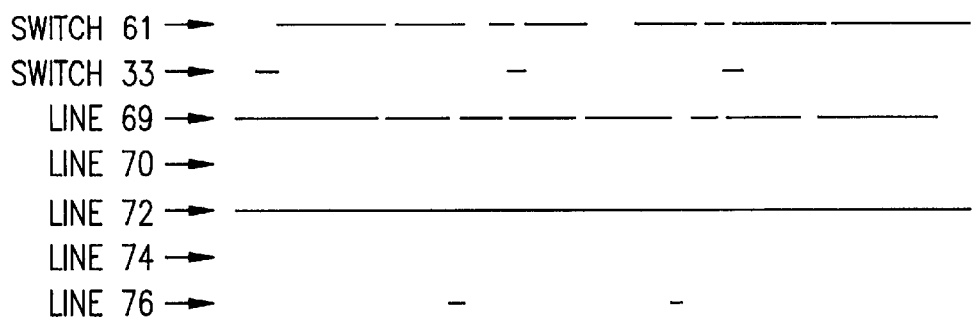
Figure 17:
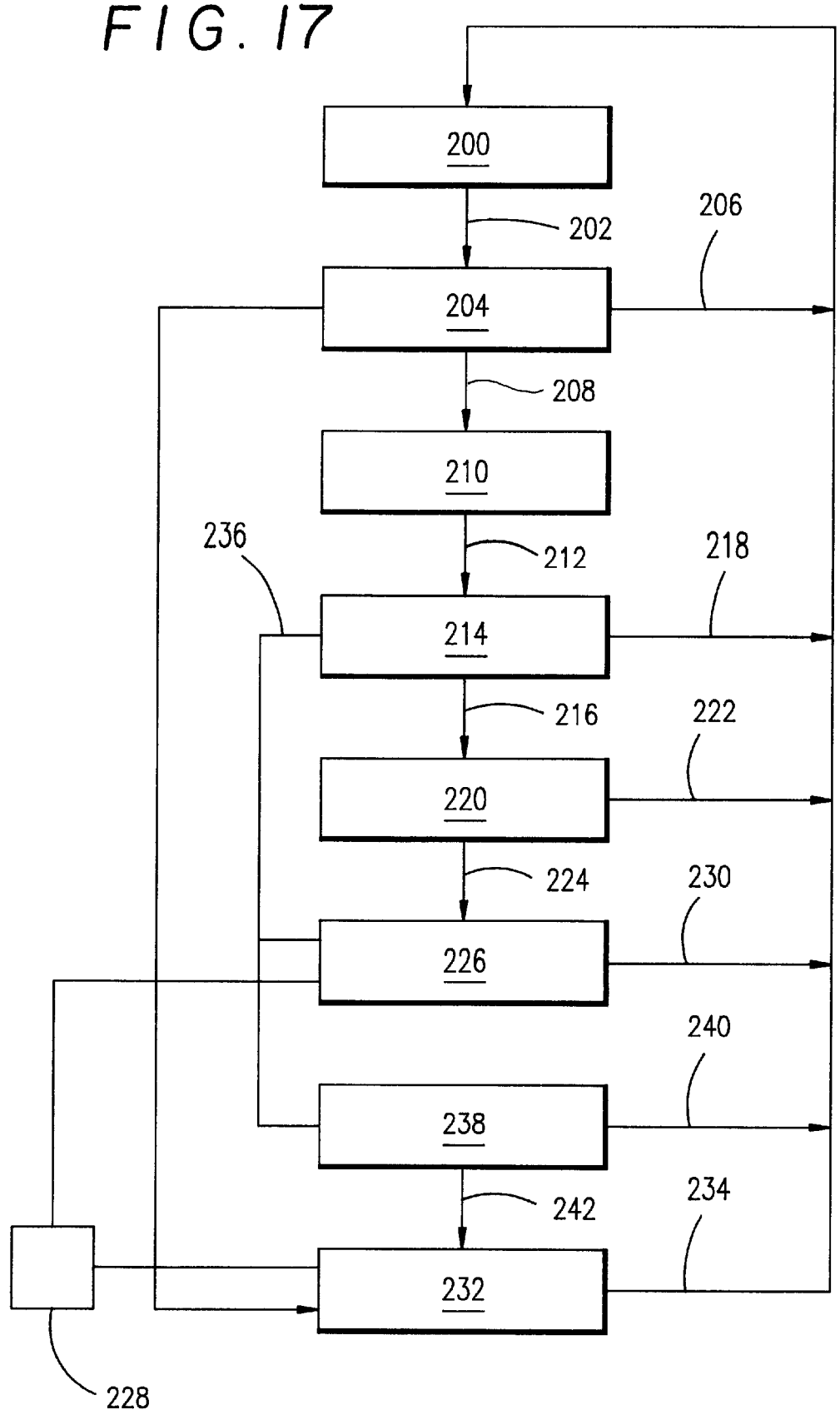
Figure 18:
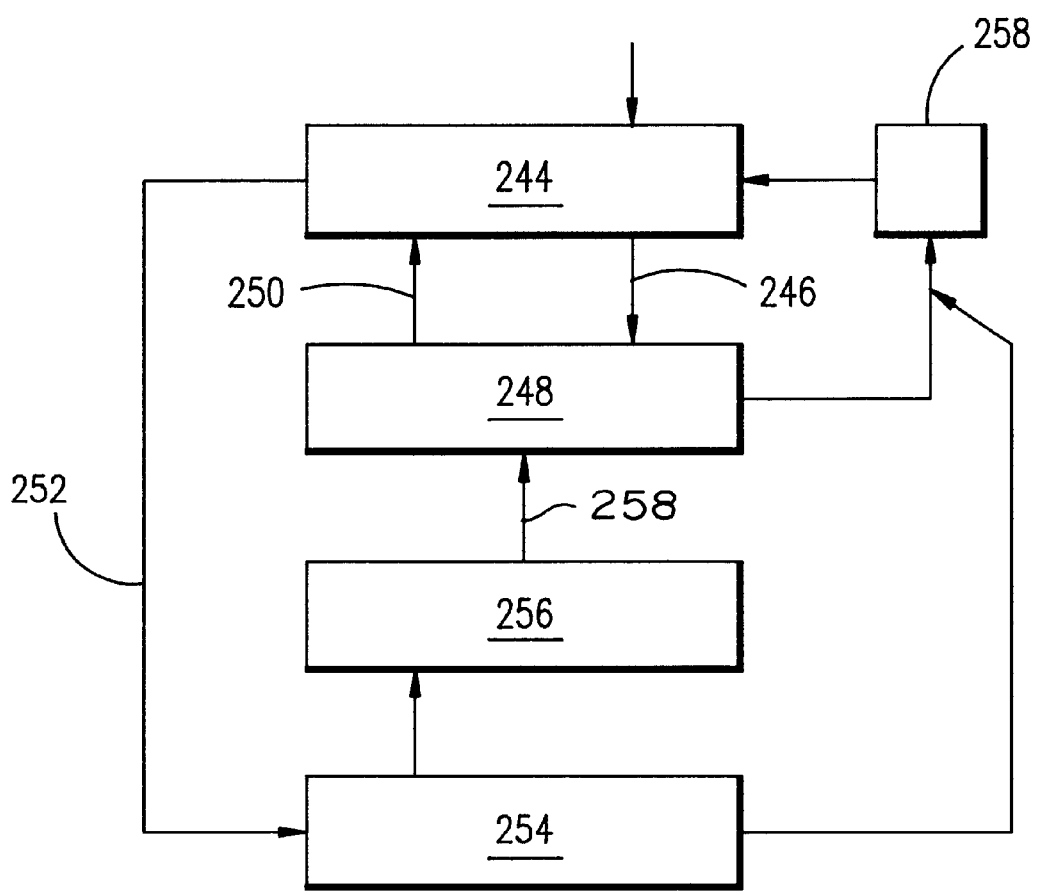

FIGS. 3(*a*), 3(*b*) and 3(*c*) are partial schematic side view cross sections of the press brake with the moving blade disposed in different positions to show the relative location of the light beams with respect to the leading edge of the blade during a pressing operation;

FIGS. 4(*a*), 4(*b*) and 4(*c*) are partial schematic side view cross sections of the press brake in use during a pressing operation and in which the path of the moving blade is impeded by an object;

FIG. 5 is a schematic diagram showing the arrangement of the laser transmitting and receiving circuits;

FIG. 6 is a front view of the control box of the safety apparatus;

FIG. 7 is a schematic diagram of the controller of the first embodiment showing the various inputs and outputs connected thereto;

FIG. 8 is a block diagram showing the logical configuration of the controller of the first embodiment;

FIG. 9*a* is a schematic end view of the disc and shaft of the optical encoder;

FIG. 9*b* is a schematic side view of the blade tracking means incorporating the optical encoder;

FIG. 10 is a graphical representation showing the relative position of the blade with respect to various input and output signals of the controller during normal operation of the press in accordance with the first embodiment;

FIG. 11 is a block diagram showing the various states of operation of the controller during normal operation of the press in accordance with the first embodiment;

FIG. 12 is a graphical representation showing the relative position of the blade with respect to various input and output signals of the controller during the setup procedure of the press in accordance with the first embodiment;

FIG. 13 is a block diagram showing the various states of operation of the controller during the setup procedure of the press in accordance with the first embodiment;

FIG. 14 is a graphical representation showing the relative position of the blade with respect to various input and output signals of the controller during the mute forced mode of operation of the press in accordance with the first embodiment;

FIG. 15 is a block diagram showing the various states of operation of the controller during the mute forced mode of operation of the press in accordance with the first embodiment;

FIG. 16 is a graphical representation showing the relative position of the blade with respect to various input and output signals of the controller during normal operation of the press in accordance with the second embodiment;

FIG. 17 is a block diagram showing the various states of operation of the controller during normal operation of the press in accordance with the second embodiment; and FIG. 18 is a block diagram showing the various states of operation of the controller during the mute forced mode of operation of the press in accordance with the second embodiment.

The first embodiment is directed towards a safety apparatus fitted to a conventional press brake where the blade is the active member and also the moving member of the press, and to a method of protecting an object entering into the path of movement of the blade. This is converse to an upstroking press brake where the blade is still the active member, but is stationary, and the bed of the press is the moving member relative to the blade.

Figure 1:
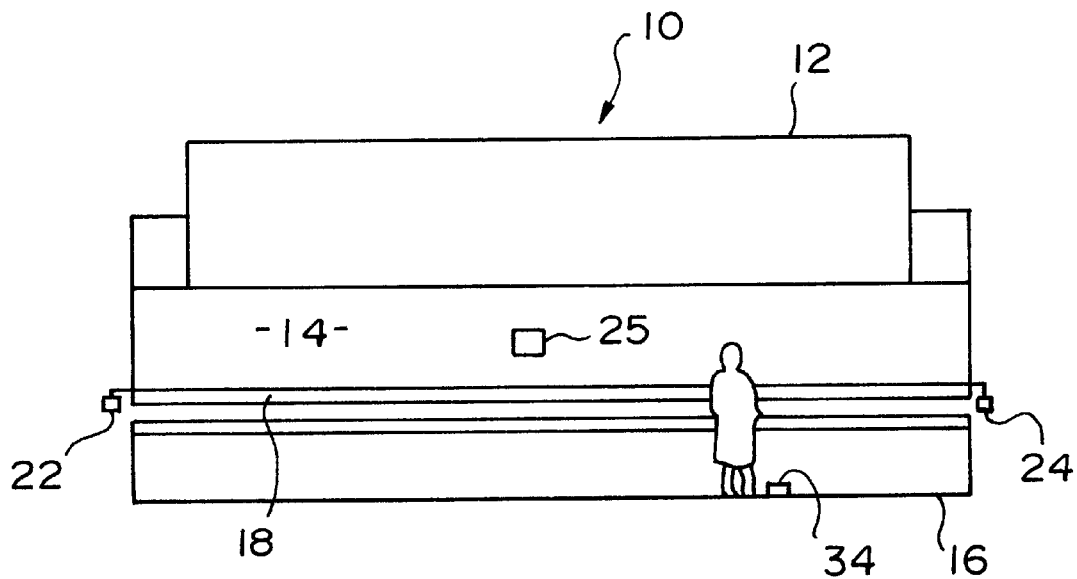
FIG. 1 is a front view of a press brake to which the safety apparatus is fitted.
Figure 2:
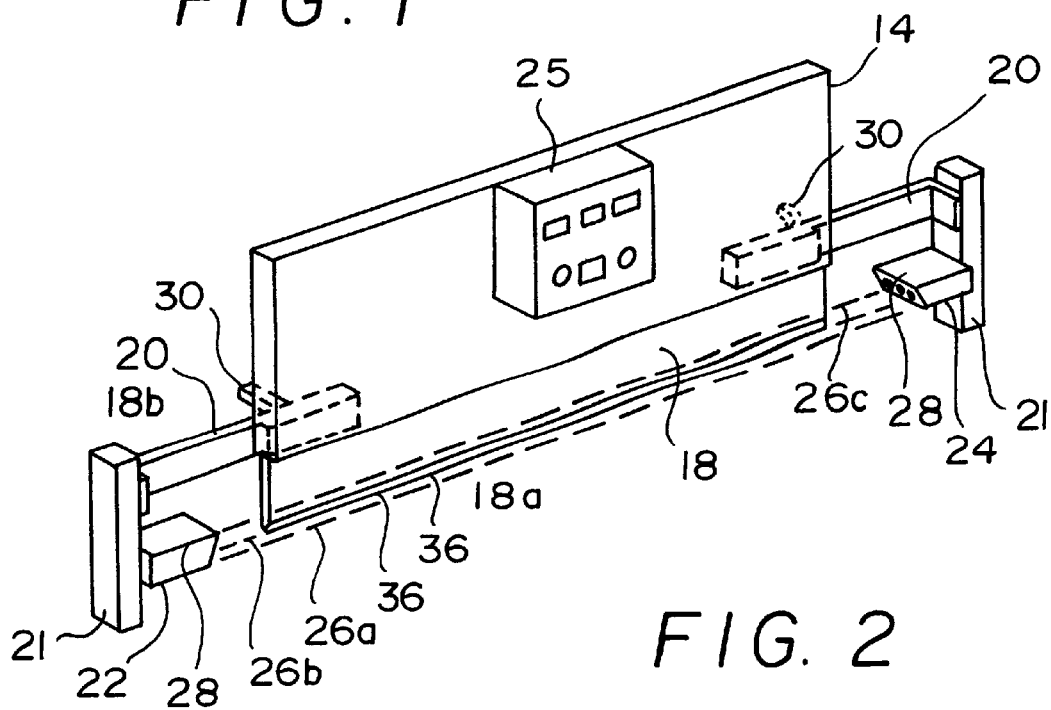
FIG. 2 is a fragmentary perspective view showing the safety apparatus of the first embodiment fitted to the press brake of FIG. 1.

As shown in FIG. 1 of the drawings, a conventional press brake 10 comprises a housing 12, a blade frame 14, a base 16, a blade 18 being both the active and moving member of the press, a pair of movement control switches disposed within a foot pedal 34, and a hydraulic system and press controller therefor(not shown) for moving the blade. The blade frame 14 houses the blade 18 and is movable in conjunction with the blade in a vertical plane from within the housing 12 by operating the press controller and hydraulic system using the movement control switches via the foot pedal 34. The blade 18 is mounted in a substantially upright manner and has a leading edge 36 as shown in FIGS. 2 to 4. The base 16 has a co-operating bed member 38 having a recess 40 provided therein which functions as a die.

An item of material to be pressed into the recess 40, for example a sheet 42, may be provided on the bed 38, as shown in FIGS. 3 and 4. The recess 40 may take any form required to effect the desired shape to which the material is pressed. In the present embodiment it is a right V-shape to generate an angle member as shown in FIG. 3(C).

In FIG. 4, there is shown a user's hand 44 manipulating the sheet 42. Accordingly, it is the function of the safety apparatus to protect incursions of the limbs of an operator into the path of movement of the blade 18 so that any limb is not impinged by the blade, which otherwise would generally result in the limb being amputated if the blade is not halted before meeting the bed 38.

The safety apparatus generally comprises a pair of adjustable bracket arms 20, a pair of adjustable vertical supports 21 mounted thereto, corresponding light emitting means 22 and light receiving means 24, and control means, part of which is housed in a control box 25.

The pair of bracket arms 20 are affixed to the blade frame 14 and extend outwardly and oppositely from the opposing ends of the blade frame to respectively locate the vertical supports 21 for the corresponding light emitting means 22 and light receiving means 24 to be mounted thereon. Accordingly, the light emitting means 22 and light receiving means 24 are disposed in housings 28 at either end of the blade 18, and furthermore, are precisely aligned so that a light beam 26 emitted from the light emitting means 22 traverses a path disposed in substantially parallel and advanced relationship to the leading edge 36 of the blade 18 as shown in FIG. 2 of the drawings. The light receiving means 24 is correspondingly disposed to normally receive the light beam 26 when the path of the same is uninterrupted.

As shown in FIGS. 3 and 4, the light beams are emitted to be disposed in close and parallel proximity to the leading edge of the blade 18. In the present embodiment, three light beams represented by paths 26a, 26b and 26c are provided which define a barrier in a plane typically 4 millimetres (mm) below the leading edge of the blade with the front and rear beams disposed typically 20 mm either side of the blade centre line.

The housings 28 for the light emitting means 22 and light receiving means 24 are hooded to minimise the effects of reflected light scatter from ambient light striking the light emitting means.

In the present embodiment, as shown in FIGS. 2 to 5, the light emitting means 22 comprises three lasers, each having well defined and accurately focussed light beams to prevent the beams from scattering and reflecting upon the bed and blade surfaces. In the present embodiment, the lasers have an angle of diffusion of less than 0.040 and are laterally spaced to dispose the light beams in a horizontal plane relative to the vertical plane of the blade 18. One laser is disposed in advance of, and marginally to the front side 18a, of the blade 18 to direct an emitted light beam along the path represented by the line 26a of the drawings; a second laser is disposed in advance of, and in coplanar relationship with, the blade 18 to direct an emitted light beam along the path represented by the line 26b; and finally a third laser is disposed in advance of, and marginally to the rear side 18b, of the blade to direct an emitted light beam along the path represented by the line 26c of the drawings.

The lasers include laser diodes 39a, 39b and 39c which are specially designed to be switched in a prescribed manner at a frequency in the kilohertz range so as to produce a pulsed light beam having a period in the millisecond range. At this frequency, the pulsing of the light beam is not apparent to the naked eye and so the light beam appears as a continuous beam.

The light receiving means 24 comprises a laser light sensor 41 including lens 43 and a mask 45 having three apertures 47a, 47b and 47c which are set up to be precisely aligned in corresponding relationship with the respective laser diodes 39a, 39b and 39c to receive the light beams emitted therefrom. The mask 45 is provided to allow only correctly aligned light beams through the apertures 47 to the laser light sensor 41.

The laser diodes are mounted in adjustable sights (not shown) to focus and direct the light beams along their respective paths. The sights are fixedly and integrally mounted to form a separate discrete unit by press fitting them into a solid nylon mounting block. This mounting block spacially fixes their position relative to each other so that any vibrational effects upon the light emitting means 22 are transmitted equally and simultaneously to all of the lasers.

The laser sensor 41 is mounted in a cylinder with the lens 43 and the mask 45 is integrally mounted to the front of the cylinder, whereby all elements of the light receiving means 24 form a separate discrete unit by similarly being press fitted into another solid nylon mounting block for minimising and uniformly transmitting any vibrational effects applied to the light receiving means 24 to the laser sensor.

The lens 43 is disposed in relatively close proximity to the front of the cylinder and the mask to enable receipt of all three light beams and enable the use of a single sensor 41. This is required when the light beams are disposed in particularly close relationship with each other where reliable sensing cannot be obtained using individual sensors. However, in cases where the light beams can be disposed further apart, individual sensors and lenses can be used for respective light beams.

The housings 28 of the corresponding light emitting means 22 and receiving means 24 are adjustably mounted in the vertical and horizontal planes with respect to the vertical supports 21. This allows for variance in different blades which may be fitted to the press brake.

The bracket arms 20 and the vertical supports 21, in conjunction with the housings 28 and the laser mounting arrangement, are strong enough to ensure that the laser diodes do not vibrate separately of the blade 18 and are light enough to ensure that vibration frequency at the end of the blade is not reduced too much, since an increased mass at the end of the blade results in an increase in the laser detection time.

It should be appreciated that laser beams are typically not directionally stable, whereby the emitted light beam generally oscillates in two transverse dimensions about a mean sensing point for the corresponding mask aperture 47. A typical average oscillation time for this is 14 ms and the oscillation distance can be as wide as 3 cm. This would generally result in the laser detection time being too excessive to be workable in the present application. This is overcome in the present embodiment however, by fixedly mounting the light emitting means 22 and the light receiving means 24 directly to the blade frame 14 using the bracket arms 20 and the vertical supports 21 as previously described. In this manner, the mass of the blade frame 14 and the blade 18 in the vertical plane is so great relative to the transverse plane that very little vertical oscillation occurs. Consequently, most of the vibration is in the transverse plane, reducing the laser detection time to a satisfactory level.

With vertical oscillation being negligible, the lasers can be vertically disposed in close proximity to the leading edge 36 of the blade 18. This is particularly advantageous with respect to setting the "mute point" of the apparatus to close tolerances relative to the material to be pressed. The mute point will be described in more detail later.

Notwithstanding this, the significant horizontal oscillation will still have an effect on the lasers and laser sensor, as they are disposed in relatively close proximity to each other in the horizontal plane. Accordingly, the horizontal oscillation can result in occasional cross aligning of a laser light beam with the mask aperture 47 for an adjacent laser. Consequently, the manner in which each laser diode 39 is switched is unique to that laser so that the laser sensor 41 can differentiate between the receipt of a particular light beam and the receipt of light beams emitted from any of the other adjacent lasers, thereby enabling a single sensor 41 and lens 43 to be used for multiple light beams. Hence each laser is electrically connected to a corresponding driver circuit 52a, 52b or 52c, all of which form part of the control means for switching the laser diode 39 connected thereto in a particular way to differentiate the light beam emitted therefrom from the other light beams. Similarly, the laser sensor 41 is electrically connected to a corresponding laser receiver circuit 53a, 53b or 53c, all of which also form part of the control means for sensing receipt of only that light beam emitted from the laser diode to which the laser receiver circuit corresponds.

Although the light emitting means 22 in the present embodiment has been described using three lasers and a mask 45 provided with corresponding apertures 47a, 47b and 47c to each of the light beams 26a, 26b and 26c, by locating the lens 43 in relatively close proximity to the front of the cylinder in the mask, other embodiments can be provided which include additional numbers of differently modulated lasers having corresponding laser driver circuits 52 and laser receiver circuits 53. In such embodiments, the mask is only necessary to mask the outside lasers since by correct installation of the light emitting means and the formation of same as a discrete integral unit, adjacent light beams will be correctly aligned relative to one another once the outer light beams are correctly aligned with respect to the light receiving means 24. Accordingly, the receipt of different lasers can be differentiated between each other by virtue of their unique modulation or encoding as opposed to alignment with corresponding apertures.

As shown in FIG. 7, the control means comprises a main controller 51 is arranged to receive various input signals for controlling the operation of the press brake and sensor signals effecting predetermined safety parameters of the apparatus, process these signals and generate relevant output signals for operating the press brake, driving the lasers, halting advancing movement of the blade in response to the occurrence of certain prescribed contingencies and providing relevant information to an operator of the safety apparatus and press brake.

The controller 51 in the present embodiment is in the form of twin microprocessor systems, configured in a dual master-slave system, providing for constant cross-checking of each other to ensure that there is no logic malfunction between the two. The master microprocessor is designed to check the input/output devices connected to the controller and the slave processor, and the slave microprocessor is designed to check the master processor and PLD.

The microprocessors are programmed to provide specific processes as logically shown in FIG. 8, comprising: a laser control and processing means 54, incorporating pulsing means 55 to switch the laser driver circuits 52 in a prescribed manner; blade movement control means 56 for controlling the general movement of the blade 18 of the press brake; halting means 57 to halt advancing movement of the blade; blade position processing means 58 including tracking means 59 to separately track and check correct movement of the blade; and setting means 60 to set the control parameters of the safety apparatus, including the mute point, and provide for testing of the same.

The mute point is defined to be a position reached by the leading edge 36 of the blade 18 pursuant to advancement towards the base 16 at a prescribed distance above the workpiece material 42 intended to be pressed upon the bed 38. At this point, the halting means is disabled, ceasing protective sensing of the light beams and allowing the blade to progress beyond the initial prescribed range of protective movement, through a further prescribed range of movement, to engage the material 42 and press it against the bed 38 of the press brake.

The mute point is normally set at a distance from the outer surface of the work piece being pressed, which is smaller than the height of an object intended to be protected by the safety apparatus. In the present embodiment, such an object is a finger of an operator and so the mute point is normally set to a distance of 6 mm to 7 mm above the outer surface of the work piece being pressed.

The laser control and processing means 54 is designed to operate the pulsing means 55 so as to cause the laser driver circuits 52 to generate laser light beams in the prescribed manner. The pulsing means 55 modulates the respective laser driver circuits 52 with a unique code at the same or different frequencies in order to differentiate between the respective emitted light beams. This code is a prescribed repetitive digital code which can be accurately sensed by the corresponding laser receiving circuits 53 of the light receiver means and be processed by the laser control and processing means 54 to detect an interruption caused by the incursion of an object into any one of the light beams. Accordingly, the laser control and processing means 54 is programmed to continuously monitor the signals received from the laser receiving circuits 53 in conjunction with operating the pulsing means 55 and determine whether all three beams are received and sensed at the same time within a prescribed period of time. If this does not occur, then it is assumed that one or more light beams have been obstructed and a contingency procedure is invoked involving the laser control and processing means 54 immediately triggering the halting means 57 to halt advancement of the blade 18. The blade movement control means 56 will then instigate a different mode of operation for the press brake, which will be described in more detail later.

The laser control and processing means 54 is programmed to include vibration sensing means to distinguish between normal vibration of the light beams caused by the operation of the press brake and abnormal interruption of any one of the beams caused by an obstruction. The vibration sensing means also provides some tolerance to the false detection of light beams and consequently reduces occurrences of false triggering of the halting means.

As previously described, due to the accurate focussing of the laser light beams, there is a significant horizontal oscillation, whereby the light beams will only periodically be received and sensed by the light receiving means. However, due to the integral mounting of the laser diodes and the laser sensor with the mask apertures, when the light beams are momentarily aligned with their corresponding mask aperture, and thus are received and sensed by the corresponding laser receiving circuits 53, this will occur instantaneously and simultaneously amongst all three sensors, as will be the period of their nonalignment. Accordingly, the vibration sensing means analyses the signals output by the laser receiving circuits 53, recognising the particular characteristics of these signals which indicate normal, uninterrupted transmission of the light beams. These characteristics include the unique coding or pulsing to differentiate between the three beams; the instantaneous and simultaneous receipt of the beams; and the periodicity of such. From this analysis, the vibration sensing means can detect departures from these characteristics as being representative of either false detection of a beam, actual obstruction of a beam, or some other abnormality requiring triggering of the halting means.

For example, in the event that one of the light beams, during its period of nonalignment, was actually sensed from a reflection, then as a result of the analysis of the vibration sensing means, the laser control and processing means 54 would recognise this as being a falsely detected light beam, if none of the other light beams were aligned at that moment, and it was not expected that any of the light beams would be so aligned at that moment. Similarly, if one of the light beams during its period of nonalignment actually impinged upon the laser sensor through another mask aperture other than its own, then it would also be recognised as being a falsely detected beam, due to it not being modulated correctly for that particular laser sensor.

It should be noted that the detection time taken by the laser control and processing means to discriminate between normal, uninterrupted transmission of the light beams and an actual obstruction of one or more of the beams is required to be substantially less than the time taken for the blade to advance from the mute point to impinge the material 42 on the bed 38. This is necessary to cater for the situation where an obstruction of a beam by a limb occurs just as the blade is approaching the mute point. Obviously if the laser control and processing means 54 cannot detect that such an obstruction has occurred in time, then the blade will impinge the material 42 before it can be halted by the halting means 57.

The laser control and processing means 54 is also programmed to sense for the receipt of any ambient light that could be sensed as a legitimate light beam during the period that the laser diodes are switched off and are not transmitting any light. This may arise from welding flashes or the like in the vicinity of the press, and if detected as legitimately received light beams, could cause erroneous sensing during a time that one or more of the light beams were actually obstructed by the incursion of an object into the path of an advancing blade, severely impugning the integrity of the safety apparatus. If such erroneous ambient light is sensed and processed by the laser control and processing means 54, then an appropriate contingency procedure is invoked involving triggering of the halting means 57.

The laser control and processing means 54 is additionally programmed to operate the pulsing means 55 so that the laser driver circuits 52 switch the lasers at a frequency which produces light beams at a particular luminance that is able to be just detected by the naked eye. The switching of the laser diodes improves their longevity as opposed to switching them on continuously and allows for the unique modulation of different lasers as previously described.

Additionally, the laser control and processing means 54 is programmed to increase the switching frequency of a particular laser diode to produce a light beam of higher luminance when that light beam is not being received by a corresponding laser sensor, when it is determined by the laser control and processing means that it should be so received. This would arise if the light beam was intercepted by an object or was misaligned for some reason. Consequently, this has the advantage that in the event of a light beam being obstructed by an object, the light beam instantly increases in luminance making it highly visible to the operator to alert them to the danger and the problem, quite apart from any contingent action to halt advancement of the blade.

A further advantage of this aspect of the invention is that in the situation of initially aligning the lasers with their corresponding mask apertures 47, the higher luminance gives immediate feedback to the operator of any misalignment of the laser and facilitates their adjustment, whereby the light beam or beams would immediately decrease their luminance upon being correctly aligned.

In addition to interacting with the laser driver circuits 52 and the laser receiving circuits 53, the laser control and processing means is programmed to indicate the status of the laser sensing facility via a series of indicator lights. Accordingly, the controller 51 has outputs connected to a series of display lamps 107 provided on the control box 25. As shown in FIG. 6 of the drawings, on the left side of the control box 25, these display lamps include two sensor lights, one green sensor light 46 to signify whether all of the light beams are clear, ie. being received by the laser sensors, and one red indicator light 48 which indicates whether any one of the light beams is obstructed. Accordingly, when the laser control and processing means 54 determines that the light beams are clear, the green indicator light 46 is caused to be illuminated, and when any light beam is determined by the laser control and processing means to be obstructed, the green indicator light is extinguished and the red indicator light 48 is illuminated to signify that the beams are not clear.

On the right side of the control box 25 are a set of laser sensor clear lights comprising three green lights 50a, 50b and 50c respectively corresponding to each of the light beams. Accordingly, the light 50a corresponds to the front light beam, the light 50b corresponds to the middle light beam and the light 50c corresponds to the rear light beam. The laser control and processing means 54 causes the relevant green light to be illuminated in response to sensing the receipt of a clear light beam by the corresponding laser receiving circuit 53. The instant a light beam is obstructed, the laser control and processing means 54 causes the corresponding light to be extinguished.

The blade movement control means 56 is designed to effect direct control of the movement of the press brake in response to receiving input signals which effect movement of the blade 18, subject to the overriding operation of the halting means 57. These input signals are derived from: the pair of movement control switches operable via the foot pedal 34, which comprise a blade advance switch 61 for normally causing advancing movement of the blade 18 and a blade retract switch 62 for normally causing retracting movement of the blade; a plurality of limit switches disposed within the housing 12, which include a mute switch 63, an upper limit switch 64 and a lower limit switch 65; and a pair of control switches provided on the control box 25, which include a mode switch 31 and a blade speed switch 32. Accordingly, the controller 51 has inputs connected to these switches and a plurality of outputs isolated by a bank of relay switches 66 connected to the electrical control lines of the hydraulic system of the press brake.

The mute switch 63 is adjustably mounted within the housing 12 at a predetermined location and is operated by a striker 30 fixedly mounted to the blade frame 14. The mute switch 63 and the striker 30 are relatively and precisely positioned so that the mute switch 63 is momentarily closed by the striker when the leading edge 36 of the blade 18 reaches the mute point, following advancing movement of the blade frame 14 and blade 18 towards the bed 38 of the press.

The upper and lower limit switches 64 and 65 are similarly mounted within the housing 12 and are operated by the striker 30 and pressure sensors (not shown) connected into the hydraulic system to trigger the appropriate limit switch when the pressure of the hydraulic system exceeds a prescribed threshold representative of the blade reaching a maximal elevation or depression. The upper limit switch 64 is relatively disposed with respect to the blade frame 14 so that it is momentarily closed by the striker 30 when the blade is at its maximally elevated position within the housing 12 or by activation of its associated pressure sensor. The lower limit switch 65 is relatively disposed with respect to the blade frame 14 so that it is momentarily closed when the leading edge of the blade meets the bed 38 of the press at its maximally depressed position or by activation of its associated pressure sensor.

The mode switch 31 is key operated to move between two selectable positions, one denoting a normal protected mode of operation for the safety apparatus and press brake and the other denoting a mute forced mode of operation, where the press is not protected by the safety apparatus to the same extent as in the normal protected mode. The normal mode of operation is selected for normal operation of the press with full protection. The mute forced mode is only selected for special occasions such as pressing odd shaped materials, initialisation of the upper and lower limit switches 64 and 65, described later with respect to the setting means 60, changing of the blade, press maintenance and the like, which do not constitute part of normal use of the press. As previously mentioned, the mode switch 31 can only be operated by a key. Accordingly, it is intended that this key be retained by management and not the operator to limit switching of the mode switch 31 to the mute forced position on only those aforementioned special occasions.

In the mute forced mode, sensing provided by the laser control and processing means 54 is muted completely, however, sensing of all other aspects of the operation of the press is maintained so that advancement of the blade is locked in response to any of the press related contingencies, which will be described in more detail later. In order to accommodate this reduced protection, the advancement of the blade is different to that when the mode switch is in the normal position. Moreover, the blade advances under full speed to a prescribed distance above the mute point and thereafter proceeds in a crawling mode of operation. This aspect of operation will be described in more detail later.

The blade speed switch 32 is also key operated for switching between two selectable positions, one providing for normal continuous advancement of the blade 18, when the blade advancement switch 61 is closed by operation of the foot pedal 34, and the other providing for a crawling or pulsing advancement of the blade when operated by the foot pedal, as occurs in mute forced mode, but which adopts this mode of advancement throughout the entire range of movement of the blade. As is the case in the mute forced mode of operation, in the crawling position, the press is not protected by the safety apparatus to the same extent as in the normal protected mode.

When the mode switch 31 is disposed in the mute forced position or the blade speed switch 32 is disposed in the crawling advancement position, the halting means 57 is not responsive to contingencies arising from processing by the laser control and processing means 54. The reason for this is that press brakes are sometimes required to press oddly shaped or bowed pieces of material having an uneven profile in the vertical plane. In these situations, certain portions of the surface of the material, when placed on the bed ready for pressing, are disposed considerably closer to the leading edge of the blade than other portions of the material. These closer portions will be engaged by the blade and be forced towards the bed before the blade fully engages the other portions of the material and presses the entire longitudinal extent of the material into the bed. Consequently, if the apparatus was operating with the halting means being responsive to the laser sensing system, a mute point would need to be set relative to the uppermost portion of the material, requiring the blade to travel a considerable distance before engaging the remainder of the surface of the material and pressing the same into the bed, during which the operator would not be protected at all. The problem is further exacerbated by the fact that in most of these situations, the operator is required to work in close proximity to the leading edge of the blade to maintain the correct position of the material until the blade fully engages the entire surface of the material before pressing it into the bed.

By allowing for the apparatus to be operated with crawling advancement of the blade, the press is permitted to be operated with total muting of the laser sensing facility provided by the laser control and processing means 54 and without regard to the mute point at all. With crawling or pulsing advancement of the blade, however, the blade can only be operated at a relatively slow speed. Thus, whilst there is no laser sensing protection for the operator at all, protection is indirectly provided by the slowed speed of the blade advancement, and is still directly provided in response to processing by the blade position processing means 58.

Switching of the blade speed switch 32 between the two selectable positions denoting normal advancement of the blade and crawling or pulsing advancement of the blade, is not as critical insofar as safety of the operator is concerned. Accordingly, the key for operating the blade speed switch 32 is intended to be left with the operator to facilitate switching between the two speed positions as desired by the operator.

A comparatively large field muted light 35 is associated with switches 31 and 32 being disposed in the mute forced mode and the crawling advancement positions, respectively. Accordingly, the controller 51 has an output connected to the light 35 which is coloured amber to enable operation of the same. This light illuminates when the sensing of the light beams is disabled or muted to signify to the operator when the protective light beams around the leading edge of the blade are muted, which will be the case when either of the switches are disposed in the aforementioned positions. The output line is also connected to a field muted light fault sensor 35a which triggers an alarm whenever the circuit connected to the field muted light 35 is open when in fact it should be closed, as might be the case if the light were blown or otherwise faulty.

The relays 66 include: a pair of blade advancing relays 67 and 68, which have a pair of duplicate blade advancing control lines 69 and 70 for connection to the blade advancing terminals of the hydraulic system; a secondary press locking relay 71, which has a press locking control line 72 for connection to the press locking terminal of the hydraulic system; a blade crawling relay 73, which has a blade crawl control line 74 for connection to the blade crawl control terminal of the hydraulic system; and a blade retracting relay 75, which has a blade retraction control line 76 for connection to the blade retraction terminal of the hydraulic system.

Closing the blade advancing relays 67 and 68 operates the hydraulic system to advance the blade 18, subject to closing of the secondary relay 71, and opening them stops movement of the blade.

The secondary press locking relay 71 provides for locking out operation of the press as part of the fail safe operation of the safety apparatus and must be closed in order for any operation of the hydraulic motor via control line 63. Accordingly, whenever the secondary relay 71 is open, movement of the blade 18 is halted absolutely, so that operation of any of the blade advancing relays 67 and 68, the blade crawling relay 73 or the blade retracting relay 75 is of no effect.

Closing the blade crawling relay 73, subject to closing of the secondary relay 71, operates the hydraulic system to cause the blade to periodically advance in a staged manner at a prescribed rate, which will be described in more detail later.

Closing the blade retracting relay 75 operates the hydraulic system to retract the blade, again subject to closing of the secondary relay 71.

The blade movement control means 56, in conjunction with and subject to operation of the halting means 57, simply effects movement of the blade frame 14 and blade 18 by closing and opening appropriate relays 67, 68, 73 and 75 in response to operation of the blade advance switch 61 and the blade retract switch 62, closing of the mute point switch 63, and the position of the mode switch 31 and blade speed switch 32.

When the mode switch 31 is in the normal mode position, the blade movement control means 56 is operated in the normal manner, activating the blade advancing relays 67 and 68 in response to closure of the blade advance switch 61 and the blade retracting relay 75 in response to closure of the blade retract switch 62. The laser control and processing means 54, halting means 57 and blade position control means 58 are also operated normally, providing full protection of the press brake and overriding operation of the blade movement control means 56 in response to particular contingencies arising.

In the mute forced mode position, where the light beam sensing facility provided by the laser control and processing means 54 is disabled or muted, but the blade position processing means 58 and other press monitoring facilities of the protection apparatus are maintained, the blade advancing relays 67 and 68 and the blade retracting relay 75 are still operated by the blade movement control means 56 in the same manner as before, except that the halting means 57 does not effect overriding operation of the blade movement control means in response to particular contingencies arising from processing by the laser control and processing means 54.

The particular manner of operation of these relays in response to these contingencies will be described in more detail later.

The halting means 57 is the kernel of the safety apparatus, being designed to operate in a fail safe manner to halt advancing movement of the blade 18 in response to being triggered when some predetermined contingency has been sensed. In this respect, the halting means can automatically override the operation of the blade movement control means 56 to effect operation of the various relays 66 to halt advancement of the blade, dependent upon the particular contingency.

In the normal protection mode, as selected by the mode switch 31, the halting means 57 responds to various contingencies which can arise from processing of the received laser light beams by the laser control and processing means 54, as previously described, or as a result of processing by the blade position processing means 58, which will be described shortly, or as a result of sensing low power to the press and/or the safety apparatus by means of a low voltage sensor 101 connected as an input to the controller 51.

In the mute forced mode, the halting means 57 responds to only those contingencies which arise as a result of processing by the blade position processing means 58 and the low voltage sensor 101.

Accordingly, the halting means 57 is responsive to the state of the mode switch 31, as represented logically by the control line 102, as well as to outputs from the laser control and processing means 54, as represented logically by control line 103, the blade position processing means 58, as represented logically by the control line 104, and the low voltage sensor 101, as represented logically by the control line 105, all as shown in FIG. 7.

The effective operation of the halting means 57 in response to contingencies arising from processing by the laser control and processing means 54 and from processing by the blade position processing means 58 is different, depending upon the particular nature of the contingency. In relation to the former, upon the laser control and processing means 56 sensing an obstruction of any of the light beams and triggering the halting means, the halting means 57 immediately overrides the operation of the blade movement control means 56, causing opening of any of the blade advancing and blade crawling relays 67, 68 or 73 that may be closed, and closing of the blade retracting relay 75 for a short period of time to retract the blade so that it effectively bounces back a prescribed distance. It then causes the blade advancing relays 67 and 68 or the blade crawling relay 73 to be closed, after the blade advance switch 61 is opened by releasing the foot pedal and then closed by depressing the foot pedal once again. If the beam is obstructed when the blade reaches the same point again, the halting means 57 again causes opening of the advancing or crawling relays 67, 68 or 73, halting movement of the blade. Instead of bouncing the blade back, the halting means permits the blade to advance by crawling or pulsing movement, closing the crawling relay 73 in response to the next closure of the blade advance switch 61 by operation of the foot pedal. The particular method of operation will be described with reference to FIG. 10 later.

With respect to other contingencies which may be representative of a malfunction of the press brake or the safety apparatus, the halting means 57 effects overriding operation of the blade movement control means 56 in a different manner causing locking up of the press. This will be described hereinafter with respect to the blade position processing means.

The blade position processing means 58 is designed to continuously track movement of the blade 18 of the press brake using the blade tracking means 59. Further, it is designed to trigger the halting means 57 in response to detecting a discrepancy in the occurrence of signals corresponding to key positions of the blade derived from the blade tracking means 59, compared with the occurrence of corresponding signals derived from the limit switches 63, 64 and 65. Accordingly, the blade position control means 58 is required to be initialised by operation of the setting means 60 to store the position of the blade 18, as derived by the blade tracking means 59, at corresponding times to the occurrence of signals derived from the aforementioned limit switches as a result of movement of the blade through its entire range of movement. This initialisation process will be described in more detail later.

In the present embodiment, the blade tracking means 59 comprises an optical encoder 77 and a rectilinear-to-rotational motion transfer means 79 connected to the blade frame 14.

As shown diagrammatically in FIGS. 8a and 8b of the drawings, the optical encoder 77 is of conventional design comprising a disc 81 fixedly mounted to a rotatable shaft 83 connected to the rectilinear-to-rotational motion transfer means 79 to rotate directly in response to rectilinear movement of the blade 18, and an opto-electrical counter comprising a light emitting device 85, a photo-electric sensor 87 and a digital up/down counter 89. The disc 81 has a series of equidistantly spaced apertures 91 transversely disposed around the circumference of the disc 81 and is mounted relative to the opto-electrical counter so that the light emitting device 85 emits a beam of light aligned with the photo-electric sensor 87 axially through the apertures 91 from one side of the disc to the other side of the disc. Accordingly, the counter 89 sequentially counts pulses of light passing through successive apertures 91 as they rotate past the opto-electric counter in an incremental or decremental manner relative to the direction of rotation of the disc 81 and the extent of rotation thereof as caused by movement of the blade 18.

The rectilinear-to-rotational motion transfer means 79 in the present embodiment is in the form of a chain and sprocket drive assembly comprising a sprocket 93 and a chain 95 engaged therewith. One end 95a of the chain is connected to the blade frame 14 and the other end 95b is connected to a return spring 97 fixedly mounted to the housing 12. The sprocket 93 is rotatably mounted with respect to the housing 12, intermediate the ends of the chain 95, and is fixedly mounted to the shaft 83 so that it causes the shaft to rotate in unison therewith in response to longitudinal movement of the chain around the sprocket. The return spring 97 applies constant tension to the chain so that movement of the blade 18 in either the advancing or retracting direction directly causes longitudinal movement of the chain 95 in a direction away from the return spring or towards the return spring, respectively, which in turn causes rotation of the sprocket 93 in either a clockwise or antclockwise direction.

Rotation of the sprocket 93 and shaft 83 directly rotates the disc 81 in unison therewith resulting in the counter 85 providing an accurate measure of the position of the blade 18 at any particular point in time. Typically, the accuracy of measurement is to 0.4 mm. Further, by analysing the rate at which pulses are sensed, a measure of the speed of the blade can be determined. This is particularly useful for effecting control of the speed of movement of the blade in he crawl mode, as will become evident later.

The blade position processing means 58 continuously analyses information supplied by the optical encoder 77 and compares this with information separately derived from the mute switch 63 to trigger the halting means to halt blade movement in response to any discrepancy sensed in the information derived from the two sources. This will be discussed in more detail later.

Accordingly, if there is any discrepancy beyond a prescribed tolerance between the sensed occurrence of closure of the limit switches 64, 65 and 66 and the corresponding locations of the blade 18 as sensed by the blade tracking means 59 at these locations as originally set, by the setting means, then the blade position processing means 58 issues a signal to trigger the halting means 57 to halt movement of the blade and lock the press brake out from further operation until the fault is cleared.

The response of the halting means 57 to such triggering signals from the blade position processing means 58 is different than in other situations, as previously mentioned. Moreover, the halting means 57 immediately overrides the operation of the blade movement control means 56 by opening any of the blade advancing, blade crawling and blade retracting relays 67, 68, 73 and 75 which may be closed, and closing the secondary press locking relay 71.

This same operation of the halting means 57 is performed in relation to processing of the received light beam by the laser control and processing means 54 which tends to indicate a malfunction of the laser sensing system or a contingency affecting the normal operation of same, as opposed to the sensing of an obstruction. For example, in the aforementioned contingency arising from sensing erroneous ambient light during the period that the laser diodes are switched off, which could cause false sensing by the laser sensors, the halting means 57 will be similarly triggered to cause closing of the secondary relay and locking of the press in the manner described above.

It should be appreciated that the cross checking operation of the blade position processing means 58 effectively provides dual protection covering either failures in the operation of the press brake, on the one hand, or failures in the blade tracking means 59 of the safety apparatus itself, on the other hand, whereby failures in either instance would cause a discrepancy which would result in triggering the halting means 57.

It should be noted that this cross checking is also applied to the location of the mute point, whereby the halting means is triggered to override the operation of the blade position processing means 58. As previously described, the mute point is initially set via the mute switch 63, and is thereafter continuously confirmed and cross checked by the blade position processing means 58 against the set position of the blade as separately determined via the blade tracking means 59. Accordingly, upon detecting any discrepancy beyond a prescribed tolerance between the occurrence of the mute switch signification of the mute point and the blade tracking means signification of the mute point, the blade position processing means triggers the halting means. However, on triggering, the halting means 57 responds slightly differently than in the case of sensing discrepancies with other limit switches. Moreover, the halting means 57 causes the press brake to stop normal operation by opening any of the blade advancing, blade crawling and blade retracting relays 67, 68, 73 and 75 which may be closed, as is normally the case, but instead of closing the secondary press locking relay 71, it causes the control means to revert to the test mode to cause resetting of the mute point, which will be described hereinafter with respect to the setting means 60.

The setting means 60 is designed to provide for initialising of the key positions of the blade for the operation of the blade position processing means 58 and setting of the mute point of the press brake and testing thereof, as well as attendance to faults detected by the controller. Accordingly, the controller 51 has inputs connected to the main power on/reset switch 98 of the press, which has an accompanying watchdog circuit 99 connected therewith, a setup link 100 for initialising the limit switches of the safety apparatus and press, and a test/lock switch 33, and outputs connected to a test lamp 37 forming part of the series of display lamps 107 provided on the control box 25 to enable operation of the setting means 60.

The setting means 60 effects initialisation of the limit switches following switching on of the press, by activating the setup link 100. The setting means is programmed to then follow a routine whereby the blade is required to be retracted by the operator to its maximally elevated position. At this point the upper limit switch 64 will be activated, signifying to the blade position processing means 58 to set the particular position of the blade, as determined by the blade tracking means 59, as the maximal elevated position of the blade. Thereafter, whenever this point is reached by the blade tracking means 59, the blade position processing means 58 expects the upper limit switch 64 to be closed within an allowable tolerance.

Next the routine requires the blade to be fully depressed by the operator to strike the bed 38 at its maximally depressed position. At this point the lower limit switch 65 will be activated, signifying to the blade position processing means 58 to set this particular position of the blade, as determined by the blade tracking means 59, as the maximal depressed position of the blade. Thereafter, whenever this point is reached by the blade tracking means 59, the blade position processing means 58 expects the lower limit switch 64 to be closed within an allowable tolerance.

The setup link 100 is an electronic switch incorporated into the internal circuitry of the safety apparatus and cannot be operated by the operator without switching the mode switch 31 on the control box 25 to the mute forced position to disable or mute the laser control and processing means 54. Once the setup procedure has been completed, the setup link 100 is deactivated, and the mode switch 31 is returned to the normal position.

With respect to setting the mute point, the test/lock switch 33 is used in association with the test lamp 37. Accordingly, the setting means 60 is programmed so that when the press is first turned on, the test lamp 37 flashes to indicate that the mute point must be set before the press can be operated. Further still, the setting means causes the test lamp 37 to flash whenever the mute point requires setting or resetting during the normal operation of the press brake. This will occur upon first turning on the press brake and safety apparatus for operating during a work session or resetting of the press by operating the power on/reset switch 98, or in response to the blade position processing means 58 triggering the setting means 60 whenever a discrepancy in the location of the mute point is detected between what is specified by the limit switches 30 and what is cross checked by the blade tracking means, as represented logically by the control line 106 in FIG. 7.

In order to set the mute point, the setting means 60 is programmed to allow the mute point to be manually set via the mute switch 63 on the press brake whilst the test lamp 37 is flashing. As previously mentioned, this point is typically set 6 to 7 mm from the outer surface of the material 42 being pressed. After the mute point is set by the mute switch 63, the test/lock switch 63 is required to be pressed in response to which the setting means will cause the test lamp 37 to change from its flashing condition to a continuously on condition.

Next, the blade advance switch 61 is required to be closed by the operator depressing the foot pedal 34 so as to advance the blade 18. The setting means 60 is programmed to automatically stop the blade at the mute point as set by the mute switch 63.

At this point, the test/lock switch 33 is required to be pressed again whereupon the test lamp 37 will be extinguished. This second pressing of the test/lock switch 33 provides a signal to the setting means 60, causing it to confirm the position of the new point with the blade position processing means 58 as determined by the blade tracking means 59, whereupon the press is ready to use.

The setting means 60 is also programmed to signify by means of different flashing sequences of the test lamp 37 and the laser sensor lights 46 to 50 as to different faults detected by the system and the cause of lock out of the press brake, if this arises. Faults are ranked as either major or minor, and as a consequence of the controller 51 comprising master and slave processors, are divided up into faults detected by one or the other processor. In the case of faults detected by the master processor, the setting means causes these to be flashed on the test lamp 37. In the case of faults detected by the slave processor, the setting means causes these to be flashed on the laser sensor lights 46 to 50.

With respect to the master processor, the minor faults are classified as follows:

1 flash: Power up detected
2 flashes: Mute forced mode change
3 flashes: Low power
4 flashes: Mute switch moved
5 flashes: Lasers detected ambient light The major faults are classified as follows:

7 flashes: Stopping performance
9 flashes: Relay disparity
10 flashes: Opto-encoder too fast
11 flashes: Opto-encoder has travelled too far in one direction
12 flashes: The mute LED has failed 13 flashes: The setup link mode has changed during operation
14 flashes: The master processor has tried to execute an invalid mode With respect to the slave processor, all faults are major and are classified as follows:

1 flash: Sensors not checked by master
2 flashes: PLD fail
3 flashes: Master doesn't stop at mute when laser beams have been broken in previous 500 ms
4 flashes: Relay disparity
5 flashes: Laser status check code from master processor incorrect
6 flashes: Serial data from master failed In each of these instances, the setting means 60 is programmed to require the fault to be corrected before enabling the press to be operated again. For minor faults the operator is required to press the test/lock switch 33 to signify to the setting means that the fault has been cleared, whereupon the setting means proceeds with executing the appropriate part of the setup procedure to reset the parameters of the controller concerned with that fault. Subsequently, the sequence of flashes of the test lamp will be extinguished and the halting means 57 will allow the press brake to continue to operate. If the faulty condition prevails, the halting means will be triggered again, locking out the press once more. Hence it is necessary for the fault to be properly rectified in order for the press to become fully operational once more.

With respect to major faults, the operator is required to hold down the test/lock switch 33 for a period of 5 seconds, whereupon the setting means executes the entire setup procedure in order to rectify the fault. If this does not clear the fault then the setting means will cause the appropriate lights to flash once more and more serious maintenance is required to be undertaken before the press can be made operational again.

Importantly, the controller 51 is arranged so that it constitutes the entire interface between the blade advance and blade retract switches 61 and 62 directing operation of the press brake by the operator and the motor relays 66 actually effecting operation of the press brake normally in direct response thereto, thereby enabling absolute fail safe operation of the press to be achieved.

Now the method of operating the press will be described with regard to FIGS. 9 to 18.

Firstly having regard to the operation of the apparatus in normal use, reference is made to FIGS. 9 and 10. In normal use, the state of the controller 51 initially has the mode switch 31 and the blade speed switch 32 respectively disposed in the normal positions, the blade 18 initially disposed in the maximal elevated position 111, the blade advancing relays 67 and 68 open, disabling the blade advancing control lines and 70, and the field muted lamp 35 turned off, as represented by state block 112.

To change the state of the controller 51 and advance the blade, the operator is required to depress the foot pedal 34 closing the blade advance switch 61, then release the foot pedal to open the switch 61 for a period of at least 300 milliseconds, and then depress the foot pedal 34 once again as represented at point 113 to close the switch 61 once more. The blade position control means 56 will then close the advancing blade relays, asserting blade advancing control lines 69 and 70, as represented by state block 114, advancing the blade at full speed, whilst the foot pedal 34 remains depressed and the switch 61 is closed.

If there is no obstruction, and the secondary relay 71 is closed asserting the press locking control line 72, the blade 18 will continue to advance straight through the mute point 115 without stopping, as represented by state line 116. Subsequently, the pressing operation will be completed on the bed 38, as represented at 117.

At the mute point, however, there is a change of state of the controller 51, whereby both blade advancing control lines 69 and 70 will be forcedly asserted, whilst the blade crawl control line 74 will be forcedly disabled together with the retract control line 76 and the field muted lamp will be turned on to indicate that the laser sensing system is muted at that point, as represented by state block 118. Thus after the blade reaches the mute point 115 and proceeds through to the bed, the response of the laser control and processing means 54 to the receipt of the light beams by the laser receiving circuits 53 is disabled so that the light beams do not react with the material 42 as it is pressed.

Activation of the lower limit switch 65 and corresponding pressure sensor of the press, automatically cause the blade to fully retract under the normal operation of the press, after completing the pressing operation, as represented by state line 120, returning to state 112 where the field muted lamp 35 is turned off again. In addition, the blade can be retracted whilst it is above the mute point at any time from the state 114 by depressing the foot pedal 34 to close the blade retract switch 62 and assert the blade retract control line 76 as represented by state line 122.

Thus, in normal use, the safety apparatus does not impede the pressing operation in any way. Further, as the beams can be positioned to within 20 mm of the blade, the operator can work very close to the press and blade whilst full protection is maintained.

After the blade is advanced from an elevated position as represented at 119, and an object interrupts any one of the beams at 121 before the blade reaches the mute point 115 whilst in state 114, the halting means 57 will be triggered to cause the blade to retract by disabling the blade advancing control lines 69 and 70 and assert the blade retract line 76, as represented by the state block 124. Thus the blade 18 is instantly reversed away from the obstruction. Average response times of 15 to 35 mm per second with maximum blade travel of 0.77 mm during the process of the blade coming to a stop and going into a reverse direction are designed into the system. Under these conditions, it is not possible for the blade to touch the object interrupting the light beam.

The halting means 57 maintains this state 124 for a prescribed time to enable the blade to reverse its travel for a for a distance of 10 mm, for example, before disabling the blade retract control line 76, pausing movement of the blade at 123.

The blade advance switch then has to be disabled for a period of at least 300 milliseconds by releasing the foot pedal and reasserted by depressing the foot pedal again at 125, before the halting means will allow the blade to be advanced again. The blade advance relays 67 and 68 will then be closed and the blade advancing control lines 69 and 70 will be asserted, whilst the blade retract control line is disabled, as represented by state block 126.

If there is no further obstruction, this state 126 will be maintained until the blade reaches the mute point 115, as represented by state line 128. If there is another obstruction, such as at 127, which may be at the same point 121 as the previous obstruction, the halting means causes a change of state of the controller 51 as represented by state line 130, whereby the blade advance relays 67 and 68 will be opened, disabling blade advancing control lines 69 and 70, and instead of asserting the blade retract control line 76, maintaining it in its disabled state, causing a halting of the movement of the blade at 129, as represented by state block 130.

As in the case of state 114, the blade can be retracted from its advancing state 126 at any time before it reaches the mute point 115 by asserting the blade retract control line 76, as represented by state line 134. Similarly, from state 132, the blade can be retracted to return to its state 112, by asserting the blade retract control line as represented by state line 136.

In order to advance the blade from its halted state 132, the blade advance switch needs to be disabled for at least 300 ms by releasing the foot pedal and reasserting the same by depressing the foot pedal, as shown at 131. Thereafter the state of the controller is changed as represented by state line 138, by asserting the blade advancing control lines 69 and 70 and the blade crawl control line 74, as represented by state block 140.

Thus the blade is only permitted to advance beyond the point 127 in a crawling or pulsing manner, as shown at 133. In this condition, the blade travels at a reduced speed, for example 10 mm or less per second, compared with the normal speed for advancement of the blade which is typically 20 to 50 mm per second. This reduced speed is achieved by the halting means selectively asserting and disabling the blade advance control lines, thereby repeatedly starting and stopping movement of the blade, to reduce its average speed to an acceptable level, which is less than 10 mm per second in the present embodiment, as determined by the blade position processing means 58.

This crawling state of advancement 140 is maintained, as represented by state line 142 until the blade reaches the mute point 115. During this state 140, however, the blade can be retracted to return to its fully elevated state 112, by asserting the blade retract control line 76, as represented by state line 144.

Upon reaching the mute point 115, either via state line 128 or 142, the halting means effects another change in state of the controller by opening the blade advance relays 67 and 68 to disable the blade advancing control lines 69 and 70, thereby halting movement of the blade as shown at 135 and turning the field muted lamp 35 on, as represented by state block 146. At this point, movement of the blade is paused as shown at 137, whereupon it can be either fully retracted by asserting the blade retract control line 76, returning to state 112, as represented by state line 148, or be advanced again at 139 to complete the pressing operation at 141 by proceeding to state 118, as represented by state line 150.

With the latter, the halting means maintains the blade at the mute point 115 and does not permit the blade to be advanced until the blade advance switch 61 has been disabled once more for at least 300 ms by releasing the foot pedal and reasserted again by depressing the foot pedal, as shown at 139.

As previously described, the controller is programmed to operate the press in this manner in order to accommodate material of unusual profiles such as those formed of wavy material which have a profile projecting past the outer surface of the material reposed upon the bed and beyond the mute point distance. Hence, if the safety apparatus did not have such a pulse mode facility, the safety apparatus would halt the blade and prevent completion of the pressing operation. By the same token, it should be appreciated that safety is not greatly compromised by causing the press to adopt the crawling or pulsing mode of advancement, whereby ample time is available to the operator to withdraw a hand or finger in the event that this may have caused the obstruction, or take their foot off the foot pedal before the pressing operation is completed.

Having described the normal operation of the apparatus, the various states and procedure involved with setting up and testing the apparatus following a power on or reset will now be described with reference to FIGS. 11 and 12.

In response to a power on or reset signal provided by the power on/reset switch 98, the controller 51 adopts an initial state where the blade 18 is initially disposed at its maximally elevated position 151, the blade movement control means 56 causes disabling of the blade advancing control lines 69 and 70, the setting means 60 causes the test lamp 37 to be flashed, and the halting means 57 causes the secondary relay 71 to be closed, asserting the press locking control line 72, as represented by state block 152.

The operator is then required to press the test/lock switch 33, with the blade speed switch 32 disposed in the normal position and not in the crawl position to change the state of the controller 51. The setting means 60 then allows the blade movement control means 56 to assert the blade advancing control lines 69 and 70 and disable the blade crawl control line 74 in response to the operator depress the foot pedal and operate the blade advance switch 61 as shown at 153, this change being represented by state block 154. Accordingly, the blade advances towards the bed 38 as shown at 155.

After the blade has travelled 10 mm, the state of the controller changes again at 157 by the halting means 57 opening the secondary relay 71 and disabling the press lock control line 72 to lock further movement of the blade, as represented by state block 156. If the blade does not stop quickly enough as determined by the blade position processing means 58 and the blade tracking means 59, the controller is programmed to cause a stopping performance error to be generated.

The setting means 60 is programmed to pause the blade at the position 159 in the locked state 156 for a period of at least 3 seconds during which the blade advance switch 61 is disabled by the operator releasing the foot pedal.

The locked state 156 is changed at 161, only after the operator restarts the press, causing the halting means to reassert the press lock control line 72, and closing the blade advance switch 61 again by depressing the foot pedal. As shown in FIG. 10, the setting means causes the blade crawl control line 74 to be asserted, advancing the blade in a crawling advancement mode, as represented by state block 158. It should be noted that the blade advancing control lines 69 and 70 are maintained in an asserted state during this locked state to ensure fail safe operation of the secondary relay 71.

With this change of state at 161, the blade advances as shown at 163 and is required to be deliberately obstructed by the operator before reaching the mute point 115. This obstruction is shown to occur at 165, whereupon the halting means would normally be triggered by the laser control and processing means 54 to cause a change in state, whereby the blade advancing control lines 69 and 70 are disabled, halting further advancing movement of the blade, as represented by state block 160.

This state 160 is a standard lock state for the apparatus that is entered into and maintained by the controller, as shown at 167, every time that the mode switch 31 is changed to the mute forced mode position or that a minor fault occurs, such as detection of power up, low power, moving of the mute switch 63, or detection of ambient light by the laser sensors. In order to change the state, the test lamp switch 33 is required to be pressed and the blade advance switch 61 opened and then closed by operating the foot pedal 34, as shown at 169.

If the standard lock state is entered above the mute point 115, the controller reverts to the previous advance state 158, advancing the blade towards the bed crawling mode again, as shown at 171.

Once the mute point 115 is reached, signified by closure of the mute switch 63 as shown at 173, the controller enters the standard lock state 160 again. It remains in this state as shown at 175 until the test/lock switch 33 is pressed again and the blade advance switch is opened and then closed by operating the foot pedal, as shown at 177.

Whilst at the mute point 115, the blade position processing means 158 records the mute point position as indicated by the blade tracking means 59, which is then checked every time the mute switch 63 is activated for any discrepancy therewith to ensure that the mute switch 63 has not moved.

Thereafter the controller adopts the state as represented by state block 162 and disables the blade crawl control line 74 to advance the blade at normal speed once more to complete pressing against the bed as shown at 179. Upon completing pressing, the blade remains in contact with the bed until the blade retract control line 76 is asserted by the operator by appropriately depressing the foot pedal, whereupon the blade retracts normally back to the maximal elevated position 151. The blade advancing control lines 69 and 70 are disabled when the blade travels above the mute point and are asserted again when the blade advance switch 61 is closed.

When any major fault occurs the controller enters a state whereby the press is locked by disabling the press lock control line 72, together with all blade advancing, crawl and retracting control lines 69, 70, 74 and 76. In order to change the controller from this state, the test/lock switch 33 is required to be closed for a period of 5 seconds by the operator pressing it. This will simply result in the setting means stopping strobing of the watchdog circuit 99, which will automatically cause both processors to be reset, invoking the full setup procedure.

The operation of the safety apparatus in the mute forced mode will now be described with reference to FIGS. 13 and 14.

In this mode, the mode switch 31 is disposed in the mute forced position and the test/lock switch 33 is momentarily closed by pressing it to unlock the press. Initially, the controller 51 adopts a state represented by state block 180 where the blade advancing control lines 69 and 70 are disabled as shown at 181.

In order to change from this state and move the blade 18 towards the bed 38, the blade advance switch 61 needs to be opened for at least 300 ms and then be closed by operating the foot pedal 34, as shown at 183, and represented by state line 182. The controller then adopts a state as represented by state block 184, where the blade advancing control lines 69 and 70 are asserted, causing the blade to advance normally, as shown at 185 to a limit height 187, which in the present embodiment is preset to within 15 mm of the mute point 115.

At the limit height 187, the controller enforces a crawl advancement of the blade to be adopted, as shown at 189, by asserting the blade crawl control line 74. The crawl advancement is then regulated by the halting means 57 and blade position processing means 58 to limit the average speed of advancement to below 10 mm/s by disabling and asserting the blade advancing control lines 69 and 70 periodically, as shown at 189a. The blade advancing control lines are continuously asserted, as shown at 189b, when the blade normally advances at a speed of less than 10 mm/s.

The controller 51 maintains this crawling advancement state until the blade reaches the mute point 115, as shown at 191. At the mute point, the controller reverts to its original state 180, as represented by state line 186, where the blade advancing control lines are disabled by the halting means 57, halting further advancement of the blade, as shown at 193.

In order to change from this state 180, the blade advance switch 61 is required to be opened for at least 300 ms and closed again by the operator operating the foot pedal, as shown at 195 and represented by state line 188. Consequently, the controller adopts a state represented by state block 190, where the blade advancing control lines 69 and 70 are asserted and the blade crawl control line 74 is disabled and pressing of the material into the bed is completed, as shown at 197.

Thereafter, the blade retracts, whereupon the blade advancing control lines 69 and 70 are automatically disabled after the blade retracts beyond the mute point 115, as shown at 199 and represented by state block 192. The controller can change its state to advance the blade once more towards the mute point by adopting the state 184, upon the operator opening the blade advance switch 61 for at least 300 ms and then closing it again by operating the foot pedal, as represented by state line 194, without having to return to its initial state 180.

The second embodiment is substantially identical to the first embodiment, except that instead of relying upon relatively fixed limit switches disposed within the housing 12 of the press brake to determine the mute point, the safety apparatus uses a different technique of establishing the mute point and checking same during actual operation, to ensure safety of the operator and prevent bypassing of the protection system during normal operation of the press.

The physical components of the safety apparatus of the present embodiment are the same as those of the previous embodiment except that the mute switch and associated striker bar are omitted, and the control means includes a controller made up of the same microprocessor arrangement, but programmed slightly differently with respect to the functions performed by the laser control and processing means, the blade position processing means and the setting means, in order to provide for and accommodate the different determination and monitoring method for the mute point. Accordingly, the same reference numerals will be in describing the various components of the safety apparatus of the present embodiment as were used in the preceding embodiment, where appropriate.

The safety apparatus of the present embodiment finds particular and essential utility in those types of press brakes which have relatively complex electronic control systems for operating the hydraulic system of the press brake and which do not rely upon or cater for the provision of mechanical limit switches.

The laser control and processing means 54 of the present embodiment is substantially identical to that of the preceding embodiment, working in conjunction with the pulsing means 55 and laser driver and receiving circuits 52 and 53 respectively, in the same manner to determine faults and obstructions of the light beams as before. The laser control and processing means 54 differs in the manner of its operation, however, by continuing to process laser receiving circuit information in an unmuted manner, after the blade 18 reaches the predetermined mute point of the press. Moreover, the laser control and processing means 54, with the aid of the blade position processing means 58, checks that the central light beam 26b is interrupted within a prescribed distance of advancement of the blade beyond the mute point, and if not interrupted within this distance, maintains unmuted sensing of the light beams, triggering the halting means 57, immediately upon sensing an obstruction to any one of the light beams. In the event that the central light beam is interrupted within the prescribed distance, further sensing of the light beams is muted, allowing the blade to continue advancing and presumably complete its pressing operation.

The blade position processing means 58 again is substantially identical to that of the preceding embodiment, working in conjunction with the blade tracking means 59 to monitor the movement of the blade and provide relevant position and speed information to the other processing elements of the controller 51. However, the blade position processing means does not provide for cross checking of the mute point with a mute switch and instead simply relies upon the initial setting of this by the setting means 60 with respect to the positional data obtained from the blade tracking means 59.

Consequently, the blade position processing means 58 interacts with the halting means 57 in a slightly different manner than in the case of the preceding embodiment, whereby mute point information is used to determine unmuted sensing of the light beams, after the mute point has been reached by the leading edge 36 of the blade, and muting of further sensing of the light beams is contingent upon the central light beam being interrupted within the prescribed distance, as previously described.

The setting means 60 is different from that of the preceding embodiment insofar as the establishment of the mute point is concerned. In all other respects, the setting means is substantially the same as that of the preceding embodiment. Hence, the setting means 60 derives upper and lower limits of the blade from either limit switches or the controller system of the press brake itself, as in the case of the preceding embodiment, and includes appropriate software to establish upper and lower limits depending upon the actual type of press in relation to which the safety apparatus is used.

In the present embodiment, the mute point is established as part of the normal operation of the press and does not involve a separate setting up procedure as was the case in the previous embodiment. Accordingly the setting means operates continuously to indicate when a particular point attained by the leading edge of the blade is to be recognised and recorded as the mute point. This is simply achieved in the normal operation of the press by advancing the blade until receipt of the central light beam 26b is interrupted. In this situation, as is normally the case, the blade will bounce back a prescribed distance as a result of overriding operation of the halting means 57. The blade then be advanced again and if the central beam 26b is broken at the same point, within a prescribed tolerance, the halting means will halt the blade at that point and enable the setting means 60 to operate. The setting means causes the field muted lamp 37 to flash, signifying to the operator that the mute point can be set at this point by pressing the test/lock switch 33. If the test/lock switch 33 is closed at this time, then the blade position processing means 58 will record that position of the blade as the mute point. Thereafter the blade position processing means 58 will assign a prescribed tolerance and zone to the mute point, within which interruption of the central light beam is expected to be consistent with the recorded mute point being the actual mute point for the pressing operation and not a falsely recorded mute point.

Operation of the press with respect to its various states and establishment of the mute point in accordance with the present embodiment will now be described with reference to FIGS. 15 to 18.

Firstly having regard to the normal operation of the press, in which the mode switch 31 and the blade speed switch 32 are both disposed in the normal position, the controller 51 adopts an initial state, represented by state block 200, at which the blade 18 is disposed at its maximally elevated position 201 above the bed 38. In this state, the blade advancing control lines 69 and 70 are disabled and the field muted lamp 37 is off.

To change from this state 200, the blade advance switch needs to be opened for at least 300 ms and then closed by the operator operating the foot pedal 34, as represented by state line 202 and as shown at 203. Consequently the blade advancing control lines 69 and 70 are asserted and the blade advances towards the bed 38, as represented by state block 204 and as shown at 205. From this state 204, the blade can be fully retracted to return to its initial state 200 at its maximally elevated position 201, by the blade movement control means 56 asserting the blade retracting control line 76 and disabling the blade advancing control lines 69 and 70, in response to closure of the blade retract switch 62 by the operator, at any time before reaching the mute point, as represented by state line 206.

The blade will continue to advance towards the bed in the advancing state 204 until the central light beam 26b becomes obstructed, as shown at 207 and represented by state line 208. It should be noted that the mute point has not yet been set at this stage and so there is no permitted zone within which the interruption is required to be sensed.

At this point the controller will adopt a state, represented by state block 210, where the halting means 57 exercises overriding control of the blade movement control means 56 by disabling the blade advancing control lines 69 and 70 and asserting the blade retracting control line 76 for a prescribed period to retract the blade a prescribed distance of 4.5 mm in the present embodiment, or until the blade advance switch 61 has been opened by releasing the foot pedal for a period of at least 300 ms, whichever occurs first. This changing of state is represented by state line 212, whereupon the blade will be halted by the halting means 57, as shown at 209, until the blade advance switch 61 has been opened for the requisite 300 ms period and closed again, as shown at 211, causing the blade advancing control lines 69 and 70 to be asserted once more, advancing the blade towards the bed, as represented by state block 214.

The blade will remain in this state 212 until the light beams are interrupted or obstructed once more, as shown at 213, and represented by state line 216. During this advancing movement, the blade can be retracted to its initial position and the controller adopt its initial state 200, by the operator closing the blade retract switch 62 as previously described, as represented by state line 218.

At this stage the mute point still has not been set and there is no permitted zone within which an obstruction is required to be sensed. Consequently, the controller adopts the state represented by state block 220, where the halting means halts further advancement of the blade by disabling the blade advancing control lines 69 and 70, pausing the blade at this position as shown at 215. As in the previous state block 214, the blade can be fully retracted to the initial position 201 and state 200, in the manner previously described, and as represented by state line 222.

In order to change the state of the controller at this point, the blade advance switch 61 must be opened for a period of at least 300 ms and closed again by the operator operating the foot pedal, as shown at 217 and represented by state line 224.

The controller then changes to a state represented by the state block 226 from which the mute point can be set. Thus the controller causes the blade advancing relays 69 and 70 to be asserted, and forces the blade to adopt a crawling movement by asserting the blade crawl control line 74. The setting means 60 simultaneously causes the field muted lamp 37 to flash, whilst the laser control and processing means continues to assert that the central light beam 26b remains obstructed. This signifies to the operator whether the point 215, at which the blade was previously halted, is to become the mute point for the pressing operation, thereafter.

To accept the point 215 as the mute point, the operator is required to press the test/lock switch 33, momentarily closing it, whereupon the blade position processing means records the particular position of the blade at which it was halted as the mute point, as represented by state block 228.

If the point 215 is not accepted as the mute point, the controller will simply maintain its state 226, where the blade will simply continue to advance in crawl mode until retracted by the operator, in the manner previously described, or by the automatic operation of the press, on completing its pressing operation. This change in state involving retraction of the blade is represented by state line 230. It should be noted that during this crawling advancement of the blade, the field muted lamp 37 will be continuously flashing, signifying that the blade is advancing in a muted mode.

If the mute point is set at state 228, the controller changes state once more as represented by state block 232. Consequently, the blade advancing control lines 69 and 70 will continue to be asserted, the blade crawl control line 74 will be disabled and the field muted lamp 37 will be turned on to be illuminated continuously. Thus the blade will be allowed to advance at its normal speed to complete its pressing action, as shown at 219. Thereafter the blade will be retracted to its initial position 201, as shown at 221, and the controller will return to its initial state 200, as represented by state line 234.

With the mute point set, the permitted zone within which the central light beam is required to be interrupted or obstructed is defined a prescribed distance above and below the actual point. In FIG. 15, this is represented by the shaded area 223. Three different scenarios are actually depicted in FIG. 15, the first showing the mute point set too high with a permitted zone shown as 223a, the second showing the mute point set too low with a permitted zone 223b, and the third showing the mute point set correctly with a permitted zone 223c. The manner in which the safety apparatus of the present embodiment accommodates these incorrect settings of the mute point and still maintains full protection for the operator will become evident in describing how the apparatus operates normally with the mute point set.

Thus, on the return of the blade 18 to the initial position 201 and the controller 51 being in state 200, the operator operates the press as before to proceed to state 204, as shown at 225. The blade then advances towards the permitted zone 223, as shown at 227, in each of the instances shown in FIG. 15.

If the laser control and processing means 54 senses an obstruction before reaching the mute point set within the permitted zone 223, and outside of the zone (not shown), the controller reverts to state 210 and causes the blade to bounce back a prescribed distance, in the manner previously described. The operator then operates the press as before to proceed to state 214, whereupon the blade will advance normally once more.

If there is no further obstruction, the blade will continue to advance until it reaches the permitted zone 223.

In the case of a correctly set mute point, such as would occur within the permitted zone 223c, the central light beam 26b will become obstructed within the permitted zone 223c and cause the controller to change state, as represented by state line 236, and adopt the state represented by state block 238.

In this state 238, the halting means 57 will cause the blade advancing control lines 69 and 70 to be disabled, halting advancement of the blade, and the setting means 60 will cause the field muted lamp 37 to be turned on. This is a mandatory state for the controller to enter following sensing an obstruction of the light beams before the mute point.

To change this state, the blade can either be retracted in the usual manner by the operator closing the blade retract control line 76, as represented by the state line 240, or be advanced after the operator opens the blade advance switch 61 for a period of at least 300 ms and then close it using the foot pedal, as represented by state line 242. Performing the latter results in the controller proceeding to state 232 to complete the pressing operation.

In the case of an incorrectly set mute point, such as the one which occurs in permitted zone 223a, where the mute point is too high, the blade will advance through the permitted zone 223a, without obstruction. Immediately the blade passes the permitted zone 223a, the laser control and processing means 54 will remain active and will not be muted, maintaining full protection to the operator as represented by the further shaded region 229.

If any of the light beams 26 were previously obstructed before the blade reached the permitted zone 223a, the controller will be in state 214 as it passes through the permitted zone. If no light beams were previously obstructed, the controller will be in state 204 as it passes through the permitted zone 223a.

Thus the next obstruction of the central light beam 36b in the case of the former will result in the controller proceeding through to state 220 where the blade will be halted, and then with appropriate operation of the press by the operator, the controller will proceed to state 226, enabling a new mute point to be set by proceeding through states 228 and 232, or requiring the blade to advance in crawl mode to complete the pressing operation before retracting, where the controller follows state line 230.

In the case of the latter where the controller is in the state 204, which is the actual scenario depicted in FIG. 15, the next obstruction of the central light beam 26b, will be that shown at 231, which will result in the controller proceeding to state 210 causing the blade to bounce back from the obstruction and then to proceed to state 214 to pause the blade at position 233. Upon appropriate operation of the press by the operator, the controller will proceed through to state 220, where the advancement of the blade will be halted again at point 235 by the controller adopting state 226, in response to sensing the obstruction again. The operator is then provided with an opportunity to reset a new mute point at this position by progressing the controller through to state 228 and subsequently 232 to complete the pressing operation as shown at 237 and retracting the blade at 221, or to complete the pressing operation in crawl mode before retracting where the controller follows the state line 230.

In the case of an incorrectly set mute point, such as the one which occurs in permitted zone 223b, where the mute point is set too low, the controller will sense an obstruction before actually reaching the permitted zone. In this case the controller will proceed from state 204 to state 210, bouncing back as shown at 239 to ultimately adopt state 214 as shown at 241. Upon appropriate operation of the press by the operator, the controller will proceed through to state 220, where the advancement of the blade will be halted again at point 243 by the controller adopting state 226, in response to sensing the obstruction again. The operator is then provided with an opportunity to reset a new mute point at this position by progressing the controller through to state 228 and subsequently 232 to complete the pressing operation as shown at 245 and retracting the blade at 221, or to complete the pressing operation in crawl mode before retracting where the controller follows the state line 230.

In the case of a correctly set mute point such as shown at 223c, with the controller advancing the blade in state 204, as shown at 227, without any previous obstruction encountered, the blade will reach the permitted zone 223c, expecting the central light beam 26b to be interrupted or obstructed. This will occur if the mute point is correctly set with required tolerance for the permitted zone, resulting in the controller proceeding directly to state 232 without the blade being halted by the halting means. Consequently, the field muted lamp 37 will be turned on at 247 to indicate that the laser sensing facility is muted at that point, and the blade will be allowed to continue advancing to complete the pressing operation as shown at 249, retracting as shown at 221, with the controller following state line 234 to return to its initial state 200.

Obviously the most expedient pressing procedure to adopt is the latter, where the mute point is correctly set and there are no obstructions, whilst full protection is provided to the operator by the safety apparatus. This encourages the operator to use the safety apparatus in the intended manner, whilst deterring misuse or abuse of the apparatus.

The setup operation for the controller of the present embodiment is substantially identical to that of the preceding embodiment with the exception that there is no setting of the mute point as previously described. Accordingly, the states followed by the controller are the same as described in the preceding embodiment with respect to FIG. 12, with the exception that the setup procedure is completed with state 158.

The mute forced procedure where the mode switch 31 is in the mute forced position, is substantially identical to that of the preceding embodiment, with the additional facility of flashing the field muted lamp 37 at different stages to provide an additional indication of the status of the controller, and the exception that a new mute point is allowed to be set at different states following sensing of an obstruction of the central light beam 26b. Accordingly, FIG. 17 shows the same states followed by the controller as described in the preceding embodiment with respect to FIG. 14, with the following exceptions:

state block 244 is the same as state block 180, with the addition that the field muted lamp 37 is also turned on by the setting means state line 246 is the same as state line 182 state block 248 is the same as state block 184, with the addition that the field muted lamp 37 is also flashed by the setting means when the blade advance switch 61 is opened, otherwise it is on state line 250 is the same as state line 186 and state line 252 is the same as state line 188 state block 254 is the same as state block 190, with the addition that the field muted lamp 37 is also flashed when the blade advance switch 61 is opened, otherwise it is on state block 256 is the same as state block 192 and state line 258 is the same as state line 194 from states 248 and 254, the controller permits a new mute point to be set by pressing the test/lock switch 33 whereupon the blade position processing means 58 records the position that the blade was in at the time that the central light beam 26b was obstructed as measured by the blade tracking means 59 as the new mute point, as represented by state block 258 the controller reverts to state 244 following setting of the new mute point.

It should be appreciated that the scope of the present invention is not limited to the particular embodiments hereinbefore described. In particular, the safety apparatus and method is not limited to use in conjunction with a down stroking press brake, but may find equal utility with upstroking press brakes as previously mentioned, and with other sorts of mechanical machines such as lathes, drills, other types of presses, milling machines and the like, where an operator may need to work in close proximity to a moving tool which could cause injury if a limb or body part were to enter into the path of movement of the tool member. Accordingly, appropriate modifications and changes to the safety apparatus and method that would be obvious to a skilled person in the field of manufacturing and installing such apparatus to suit different machines are envisaged to fall within the scope of the present invention.

What is claimed is:

1. A safety apparatus for a machine having a working member provided with a working end and a work-piece supporting member, whereby one of the members is controlled to selectively move convergingly towards the other member of the machine, the safety apparatus including:

corresponding light emitting means and light receiving means for mounting in fixed relationship with the working end of the working member, so as to define a protected region fixedly spaced therefrom;

said light emitting means being adapted for emitting a beam of light and the corresponding light receiving means being adapted for receiving the beam of light so that normally the beam may be emitted and received by said corresponding light emitting means and light receiving means along an uninterrupted path fixedly spaced from the working end of the working member;

control means to activate said light emitting means to emit the light beam and said light receiving means to sense receipt of the emitted light beam during a range of prescribed movement of the moving member, said range of prescribed movement being completed at a mute point and the moving member being capable of continuing to move through a further range of prescribed movement past said mute point; and halting means for halting advancing movement of the moving member in response to some contingency as detected or sensed by said control means, said halting means being disabled from halting advancing movement of the moving member for certain contingencies during said further range of prescribed movement;

wherein said control means includes position processing means to continuously track the movement of the moving member and check that said movement is in accordance with said prescribed movement; and wherein said halting means halts advancing movement of the moving member in response to said position processing means determining that said advancing movement is not in accordance with said prescribed movement.

2. A safety apparatus as claimed in claim 1, wherein said position processing means includes tracking means to measure instantaneous movement of said moving member, said position processing means recording said mute point relative to the position of said moving member as measured by said tracking means and thereafter continuously checking for the occurrence of the measured location of the mute point as determined by said tracking means for effecting control of the movement of said moving member.

3. A safety apparatus as claimed in claim 2, wherein said position processing means continuously checks the occurrence of said measured location of said mute point and compares this against a separately determined signification of the moving member reaching said mute point to determine that the occurrence of the two is substantially simultaneous; and said halting means halts further advancing movement of the moving member immediately upon establishing that said occurrence is not substantially simultaneous.

4. A safety apparatus as claimed in claim 2, wherein said tracking means comprises an optical disc mounted to a rotatable shaft directly linked to a motion transfer means for connection to the moving member so that said optical disc rotates directly in response to movement of the moving member, and optical sensing means including an electronic counter to sense and measure instantaneous angular movement of said optical disc, whereby the instantaneous count of said electronic counter is continuously monitored by said position processing means as a measure of the movement of said moving member.

5. A safety apparatus as claimed in claim 4, wherein said separately determined signification of said moving member reaching said mute point comprises a mute switch for fixing to the machine adjacent to the moving member and a striker for fixing to the moving member adjacent to said mute switch, said mute switch or striker being adjustably mounted relative to the other so that said striker activates said mute switch precisely when the moving member is actually disposed at the mute point.

6. A safety apparatus as claimed in claim 1, wherein said position processing means continuously checks the distance advanced by the moving member beyond said mute point with a prescribed maximum distance to determine whether receipt of the emitted light beam is interrupted within said prescribed maximum distance, and said halting means halts further advancing movement of the moving member in response to said position processing means determining that the emitted light beam is not interrupted within said prescribed maximum distance.

7. A safety apparatus as claimed in claim 6, wherein said control means includes setting means to optionally set the mute point for recording by the position processing means at the point that a light beam is sensed to be interrupted during advancement of said moving member.

8. A safety apparatus as claimed in claim 1, wherein said control means includes pulsing means to cause said light emitting means to generate the light beam so that it is pulsed in a prescribed manner, and light control and processing means to control the operation of said pulsing means and process signals received by said light receiving means to determine when the emitted light beam is not received or pulsed in said prescribed manner; and wherein said halting means halts advancing movement of the moving member in response to said light control and processing means determining that the emitted light beam is not received or pulsed in said prescribed manner during said range of prescribed movement.

9. A safety apparatus as claimed in claim 8, including a plurality of corresponding light emitting means and light receiving means to be disposed to define a barrier of light paths around the working end, and said pulsing means being controlled to cause each of said corresponding light emitting means and light receiving means to be pulsed in a different manner to enable said light control and processing means to differentiate between them.

10. A safety apparatus as claimed in claim 8, wherein said light control and processing means also analyses signals received by said light receiving means to determine the receipt of ambient light beyond a prescribed threshold of intensity, and said halting means halts advancing movement of said moving member in response to same.

11. A safety apparatus as claimed in claim 8, wherein said light control and processing means controls said pulsing means to increase the frequency of said pulsing so as to increase the luminance of the emitted light beam, in response to determining when the emitted beam is not received in said prescribed manner.

12. A safety apparatus as claimed in claim 11, wherein said pulsing means is adapted to normally pulse said light beam at a frequency producing a particular luminance just perceptible to the naked eye so that when the frequency of pulsing of the beam is increased, it is clearly distinguishable by the operator.

13. A safety apparatus as claimed in claim 1, wherein said control means includes vibration sensing means to analyse signals in response to said light receiving means sensing receipt of the light beam and distinguish between normal vibration of the light beam and abnormal interruption of the light beam; and wherein said halting means halts advancing movement of the moving member in response to said vibration sensing means sensing said abnormal interruption of the light beam during said range of prescribed movement.

14. A safety apparatus as claimed in claim 13, wherein a plurality of said corresponding light emitting means and light receiving means are provided so that said light emitting means are integrally mounted in substantially parallel relationship adjacent to each other as a discrete unit relative to the working member and said light receiving means are integrally mounted in substantially similar parallel relationship adjacent to each other as a separate discrete unit relative to both the active member and said discrete unit, but in substantial alignment with said corresponding light emitting means to receive the respective emitted light beams therefrom said discrete units are mounted relative to said working member such that vibrational movement is imparted to each discrete unit as a whole, causing synchronous and corresponding oscillation to said light beams and synchronous and corresponding sensing of uninterrupted passage of said light beams by said light receiving means, thereby facilitating the analysis and discrimination of the received light beams by said vibration sensing means.

15. A safety apparatus as claimed in claim 13, wherein said light emitting means is mounted at one end of the working member and said light receiving means is mounted at the opposing end of the working member so that vibrational movement of the corresponding light emitting means and light receiving means which causes oscillatory movement of the emitted light beam is damped in one dimension transverse to the path of said light beam to essentially confine the resultant oscillatory movement of the light beam to a single transverse dimension substantially orthogonal to said one dimension to reduce the detection time taken in sensing a said abnormal interruption of the light beam.

16. A safety apparatus as claimed in claim 15, wherein said detection time is less than the time taken for said moving member to complete said further range of prescribed movement.

17. A safety apparatus as claimed in claim 1, wherein a plurality of said corresponding light emitting means and light receiving means are provided so that said light emitting means are integrally mounted in substantially parallel relationship adjacent to each other as a discrete unit relative to the working member and said light receiving means are integrally mounted in substantially similar parallel relationship adjacent to each other as a separate discrete unit relative to both the working member and said discrete unit, but in substantial alignment with said corresponding light emitting means to receive the respective emitted light beams therefrom.

18. A safety apparatus as claimed in claim 1, wherein said control means includes fault detection means to detect and discriminate between different types of faults sensed by the safety apparatus causing operation of said halting means; and setting means to generate a sensorially perceptible signal to an operator in a prescribed manner to indicate the particular type of fault that has occurred.

19. A safety apparatus as claimed in claim 18, wherein said prescribed manner involves flashing visual display signals in predetermined sequences that uniquely correspond to particular fault types.

20. A method for protecting an object entering into the path of a moving member of a machine, the moving member being either a working member provided with a working end, or a work-piece supporting member, whereby one of the members is controlled to selectively move convergingly towards the other member of the machine, the method including:
   emitting a light beam at a fixedly spaced distance along a normally uninterrupted path in advance of the working end of the working member whilst the moving member moves through a range of prescribed movement, said range of prescribed movement being completed at a mute point and the moving member being capable of continuing to move through a further range of prescribed movement past said mute point;
   continuously sensing for the receipt of said light beam after it has traversed in advance of the working end;
   halting the advancing movement of the moving member in response to any failure to receive and sense the emitted light beam at any time during said range of prescribed movement or in response to some contingency;
   preventing the moving member from being halted for certain contingencies during said further range of prescribed movement; and
   continuously tracking the movement of the moving member, checking that said movement is in accordance with said prescribed movement, and halting advancing movement of the moving member whenever the movement is not in accordance with said prescribed movement.

21. A method as claimed in claim 20, including pulsing said light beam in a prescribed manner and halting the advancing movement of the moving member in response to failing to receive and sense the emitted light beam as pulsed in said prescribed manner.

22. A method as claimed in claim 21, including emitting and sensing the receipt of a plurality of light beams disposed to define a barrier of light paths around the working end of the working member, each light beam being pulsed in a different manner to differentiate between them.

23. A method as claimed in claim 20, including analysing the received light beam to discriminate between normal vibration and abnormal interruption of the light beam and halting advancing movement of the moving member in response to sensing said abnormal interruption during said range of prescribed movement.

24. A method as claimed in claim 23, including damping vibrational movement of the light beam in one dimension transverse to the path of said light beam to essentially confine resultant oscillatory movement of said light beam to a single transverse dimension substantially orthogonal to said one dimension to reduce the detection time taken in sensing a said abnormal interruption of the light beam.

25. A method as claimed in claim 23, including emitting a plurality of light beams in substantially parallel relationship to each other such that vibrational movement from the machine is imparted equally to said light beams causing synchronous and corresponding oscillation of said light beams facilitating the analysis and discrimination of same.

26. A method as claimed in claim 20, including continuously checking the distance advanced by the moving member beyond said mute point with a prescribed maximum distance and if interruption of the light beam is not sensed within said prescribed maximum distance, halting the advancing movement of the moving member.

27. A method as claimed in claim 26, including optionally setting the mute point at a point where a light beam is sensed to be interrupted during advancement of the moving member.

28. A method as claimed in claim 20, including continuously measuring the instantaneous movement of the moving member, separately detecting the position of the mute point when the moving member is physically disposed thereat, checking that the detected mute point coincides with the measured mute point whenever the mute point condition is sensed, and halting further advancing movement of the moving member immediately upon establishing a difference in the occurrence between the two.

29. A method as claimed in claim 20 including detecting and discriminating between different types of faults causing halting of the advancing movement of the moving member and signaling to an operator in prescribed manner to indicate the particular type of fault that has occurred.

30. A method as claimed in claim 29, wherein said prescribed manner involves flashing visual display signals in predetermined sequences that uniquely correspond to particular fault types.

* * * * *